(12) United States Patent
Suzuki et al.

(10) Patent No.: US 10,067,695 B2
(45) Date of Patent: Sep. 4, 2018

(54) MANAGEMENT SERVER, COMPUTER SYSTEM, AND METHOD

(71) Applicant: HITACHI, LTD., Tokyo (JP)

(72) Inventors: Takayuki Suzuki, Tokyo (JP); Toru Tanaka, Tokyo (JP); Keisuke Hatasaki, Tokyo (JP); Toshio Otani, Tokyo (JP); Atsumi Terayama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 79 days.

(21) Appl. No.: 15/120,837

(22) PCT Filed: Jun. 26, 2014

(86) PCT No.: PCT/JP2014/066962
§ 371 (c)(1),
(2) Date: Aug. 23, 2016

(87) PCT Pub. No.: WO2015/198440
PCT Pub. Date: Dec. 30, 2015

(65) Prior Publication Data
US 2016/0357464 A1 Dec. 8, 2016

(51) Int. Cl.
*G06F 3/06* (2006.01)
*G06F 11/28* (2006.01)
*G06F 11/14* (2006.01)

(52) U.S. Cl.
CPC ............ *G06F 3/0619* (2013.01); *G06F 3/06* (2013.01); *G06F 3/065* (2013.01); *G06F 3/067* (2013.01); *G06F 11/14* (2013.01); *G06F 11/28* (2013.01)

(58) Field of Classification Search
None
See application file for complete search history.

(56) References Cited

U.S. PATENT DOCUMENTS

2009/0320029 A1 12/2009 Kottomtharayil
2010/0293412 A1* 11/2010 Sakaguchi .......... G06F 11/0727
714/17

(Continued)

FOREIGN PATENT DOCUMENTS

| JP | 2000-347919 A | 12/2000 |
|---|---|---|
| JP | 2007-257106 A | 10/2007 |
| JP | 2011-002876 A | 1/2011 |

*Primary Examiner* — Denise Tran
(74) *Attorney, Agent, or Firm* — Volpe and Koenig, P.C.

(57) ABSTRACT

A management server acquires storage and application information from a first system to store the information. The storage information includes storage area correspondence information indicating a correspondence between a storage area and a processor. The application information includes application correspondence information indicating a correspondence between the processor and an application, and application configuration information indicating a past Input/Output (IO) load on the storage area. The management server estimates an IO load on the storage area by the application based on the storage and application information to obtain an estimated value, and determines whether or not a copy processable period, a period in which a copy process of data can be performed is present, based on the data size and the estimated value. When the copy processable period is present, the management server transmits a copy indication including a start time of the copy processable period to a copy processing server.

13 Claims, 22 Drawing Sheets

(56) References Cited

U.S. PATENT DOCUMENTS

2010/0318756 A1 12/2010 Yoshinari et al.
2011/0213814 A1* 9/2011 Fukatani ............ G06F 17/30221
  707/827

* cited by examiner

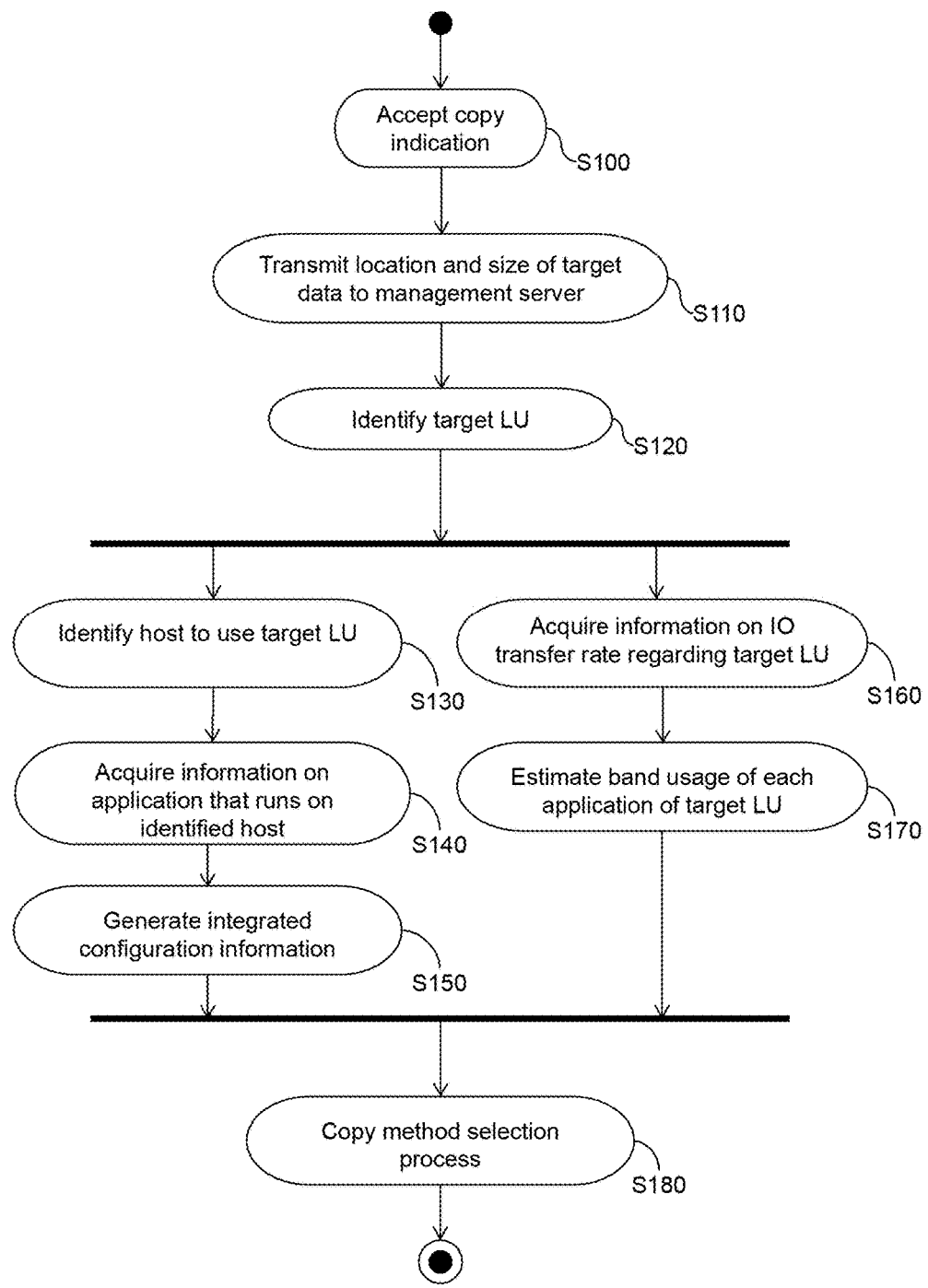

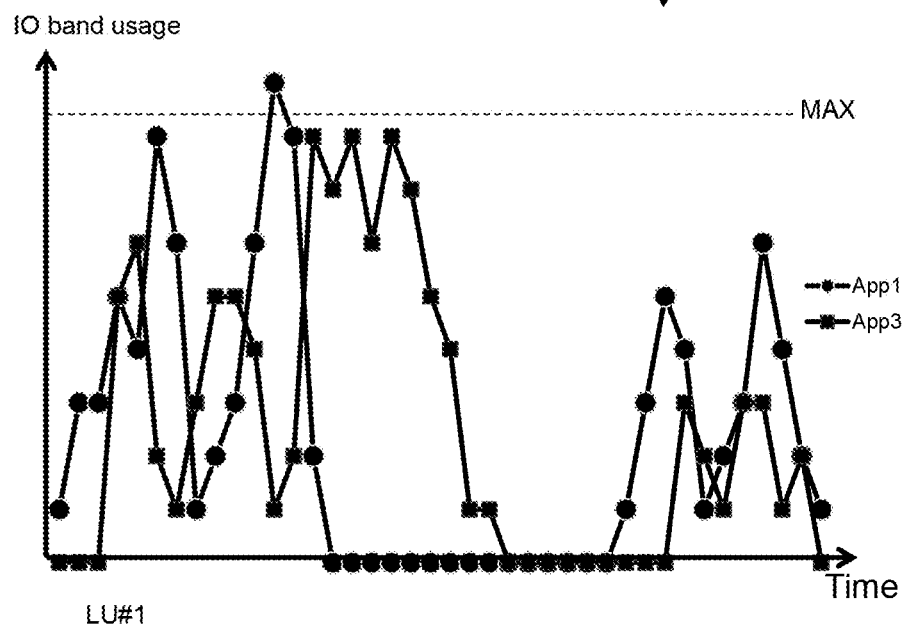

Change actual copy process start time with snapshot

MANAGEMENT SERVER, COMPUTER SYSTEM, AND METHOD

TECHNICAL FIELD

The present invention relates to a management server and to a technique for controlling copy processes of data.

BACKGROUND ART

In the development of enterprise systems, a production environment system that is an environment in which an application runs and actually provides customers with services and a development environment system that is an environment for developing an application to run in the production environment system are operated separately from one another.

In a development environment system, an application to be used by customers is developed and an operational state of the developed application is tested. In a development environment system, for the purpose of reducing man hours required by an application and confirming actual behavior, performance, and the like of the application, there is a demand to utilize data that is actually used by a development-target application in a production environment system.

With respect to this demand, an application that realizes a copy process of data from a production environment system to a development environment system is known (NPL1). In addition, a technique for performing scheduling of a plurality of applications that run on an OS is known (PTL1).

CITATION LIST

Non Patent Literature

[NPL1]
SAP TEST DATA MIGRATION SERVER explanatory material http://global.sap.com/japan/services/bysubject/customdev/pdf/B130_49009165_TestDataMigration.pdf

Patent Literature

[PTL1]
Japanese Patent Application Publication No. 2007-257106

SUMMARY OF INVENTION

Technical Problem

A copy process of data from a production environment system to a development environment system naturally imposes a load on resources of the production environment system. Therefore, a copy process is desired which minimizes the load on the resources of the production environment system. However, while a server that executes a copy process of data from the production environment system to the development environment system is capable of comprehending information on an application associated with the server, the server is incapable of comprehending operations of applications not associated with the server.

In particular, a large number of applications run on an enterprise system. Therefore, even limiting applications to be taken into consideration during a copy process to those associated with a server that executes the copy process is insufficient for reducing the load on resources of the production environment system.

Solution to Problem

In order to solve the problem described above, a management server representing an aspect of the present invention manages a production environment system (a first system) and a copy processing server. The production environment system includes a processor configured to execute an application, and a storage apparatus coupled to the processor. The copy processing server is configured to execute a copy process of data according to a copy indication that indicates copying of data stored in a storage area in the storage apparatus to a development environment system (a second system). The management server includes a storage device and a control device. The control device is configured to acquire storage information and application information from the first system and store the information in the storage device. The storage information includes storage area correspondence information indicating a correspondence relationship between a storage area and the processor. The application information includes application configuration information indicating a correspondence relationship between the processor and an application and application configuration information indicating a past IO load on the storage area by the application. The control device is configured to estimate an IO (Input or Output) load on the storage area by the application based on the storage information and the application information to obtain an estimated value, and to determine whether or not a copy processable period that is a period in which a copy process of data can be performed is present, based on a data size of the data and the estimated value. When the copy processable period is present, the control device transmits a copy indication including a start time of the copy processable period to the copy processing server.

Advantageous Effects of Invention

With the present invention, a copy process that reduces load on resources of a production environment system can be performed.

BRIEF DESCRIPTION OF DRAWINGS

FIG. 6 is a flow chart of an information acquisition process.

FIG. 7 shows an example of integrated configuration information 1700.

FIG. 8 is a diagram showing an example of a result of an estimation process.

DESCRIPTION OF EMBODIMENTS

While information according to the present invention will be described below using expressions such as an "aaa table" and an "aaa list", such information may be expressed using concepts other than data structures such as a table and a list. Therefore, in order to demonstrate that information is not dependent on data structure, an "aaa table", an "aaa list", and the like may sometimes be referred to as "aaa information".

Furthermore, while the expressions "identification information", "identifier", "name", "number", and "ID" are used when describing contents of the respective pieces of information, it should be noted that these expressions are interchangeable.

While a "program" is sometimes used as a subject in the following description, since a program causes a prescribed process to be performed using a memory and a communication port (a communication control device) when being executed by a processor, a "processor" may be used instead as a subject in the following description. In addition, a program may be partially or entirely realized by dedicated hardware.

Furthermore, various programs may be installed in a storage apparatus from a program distribution server or via a storage medium that can be read by a computer.

It is to be understood that the present invention is not limited to the examples described below.

Hereinafter, examples will be described with reference to the drawings. The present invention is not limited to the present examples.

Example 1

Figure 1:
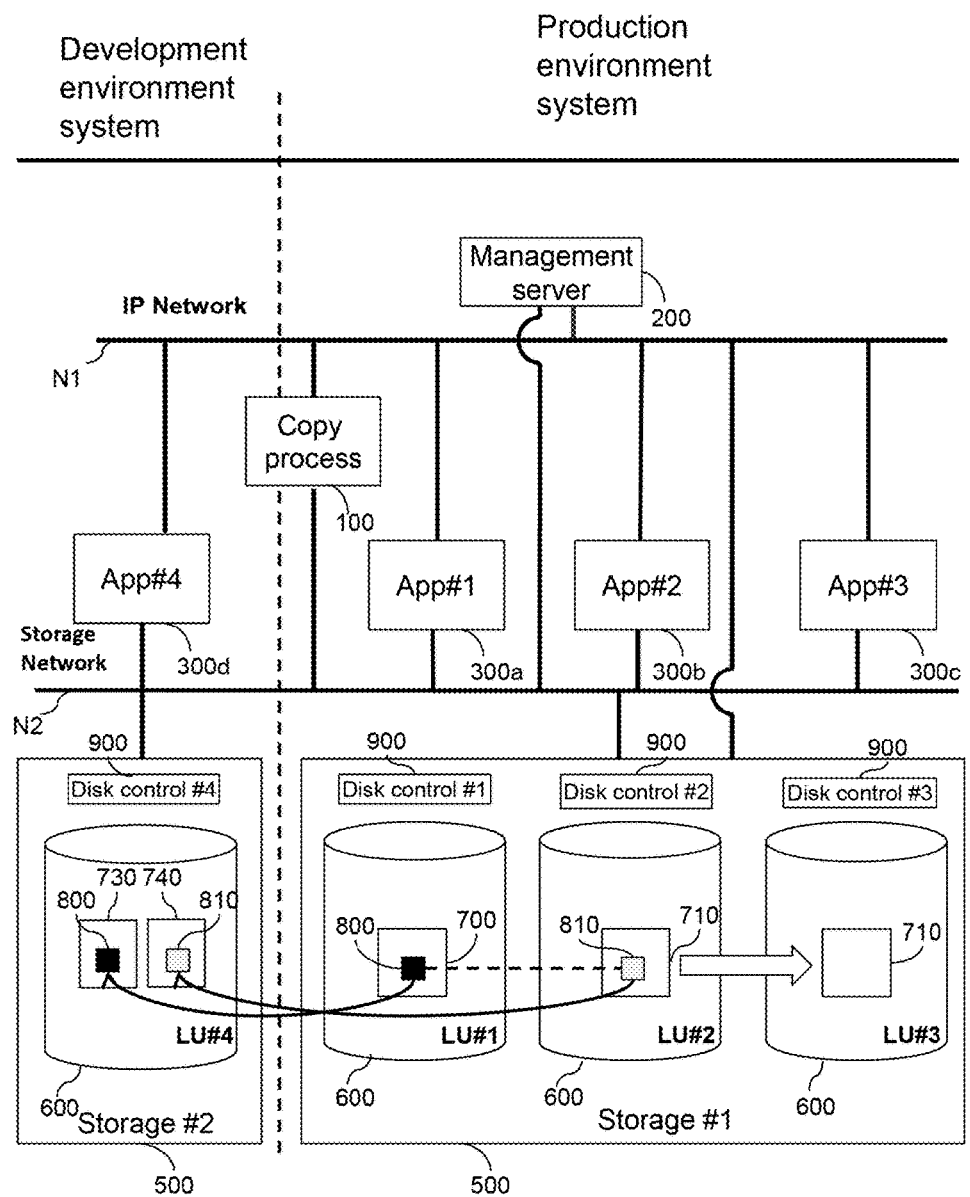
FIG. 1 is a functional configuration diagram of a computer system according to Example 1.

FIG. 1 is a functional configuration diagram of a computer system according to Example 1.
<Configuration of Computer System>

The computer system according to Example 1 includes a plurality of application servers 300, a copy processing server 100, a management server 200, and a plurality of storage apparatuses 500. The plurality of application servers 300 and the plurality of storage apparatuses 500 are coupled to each other via a storage network N2 that is, for example, an FC or an iSCSI. Each of the application servers 300, the copy processing server 100, and each of the management servers 200 are coupled to one another via an IP (Internet Protocol) network N1 that is, for example, a LAN (Local Area Network). Each server may be a physical server or a functional server that runs on one or more physical computers. The application servers 300 execute an application for each business operation. Moreover, in the following description and in the drawings, applications executed by the respective application servers 300*a* to 300*d* may sometimes be described as APP #1 to APP #4.

The storage apparatuses 500 include one or more disk control units 900 and a plurality of physical storage devices (not shown). The disk control unit 900 provides the application servers 300 with an LU (Logical Unit) 600 based on the plurality of physical storage devices. Moreover, while the present example presents an example in which one disk control unit 900 provides one application server 300 with one LU, this configuration is not restrictive. For example, a physical storage device may be an SAS (Serial Attached Small Computer System Interface)-HDD (Hard Disk Drive), an SATA (Serial Advanced Technology Attachment)-HDD, an SSD (Solid State Drive), or a semiconductor storage device. Alternatively, a RAID (Redundant Arrays of Inexpensive Disks) group may be constructed by a plurality of physical storage devices.

In the present example, for example, application servers 300*a* to 300*c* which execute APP #1 to APP #3, a storage apparatus #1 which includes LUs 600 (LU #1 to LU #3) corresponding to the respective application servers 300*a* to 300*c*, and a system including the application servers 300*a* to 300*c* are assumed to constitute a subsystem belonging to a production environment in which actual business operations are executed. In the following description and in the drawings, this subsystem may sometimes be referred to as a first system or a production environment system. In addition, in the present example, an application server 300*d* which executes APP #4 and a storage apparatus #2 which includes an LU #4 corresponding to the application server 300*d* are assumed to constitute a subsystem belonging to a development environment in which an application to be executed by the production environment system is developed and the developed application is tested. In the following description and in the drawings, this subsystem may sometimes be referred to as a second system or a development environment system.

The copy processing server 100 is a server with a copy processing function for copying data in the production environment system to the development environment system. While the copy processing server 100 is assumed to be a physical server with a copy processing function in the present example, the copy processing server 100 may instead be a functional server realized by a host computer (hereinafter, a host 301). Specifically, for example, the copy processing server 100 is the Test Data Migration Server, a product of SAP SE. The copy processing server 100 executes a copy process of target data based on a copy indication including information on the target data. Execution of a copy process by the copy processing server 100 may involve, for example, the copy processing server 100 identifying a copy source and a copy destination of the target data, reading the target data from the copy source, and transmitting the target data to the copy destination, or the copy processing server 100 transmitting a copy instruction including information such as a copy source and a copy destination of the target data to an execution target of the copy process. In this case, an execution target of the copy process is configured in advance and may be, for example, the storage apparatus 500 that is the copy source or the copy destination of the target data or another server such as the management server 200.

In addition, a production environment system includes an application server associated with the copy processing server 100 and an application server not associated with the copy processing server 100. An application server associated with the copy processing server 100 is, for example, a server that executes an application provided by a same vender as an application executed by the copy processing server 100. In the present example, for example, the application servers 300*a* and 300*b* which execute APP #1 and APP #2 are application servers associated with the copy processing server 100. The copy processing server 100 and the application servers 300*a* and 300*b* are mutually capable of recognizing each other's presence and communicating with each other when necessary. On the other hand, the application server 300*c* that executes APP #3 is an application server not associated with the copy processing server 100. This means that the application server 300*c* operates regardless of the copy processing server 100 and the application servers 300*a* and 300*b*. In other words, the application server 300*c*, and the copy processing server 100 and the application servers 300*a* and 300*b*, do not mutually recognize each other's presence. The application server 300*c* is, for example, a server that executes a backup process from LU #1 and LU #2 to LU #3.

The management server 200 is a server for managing the production environment system and the copy processing server 100. Moreover, the management server 200 may be included in the production environment system.

Hereinafter, a case will be described where, in order to use data of a production environment system in a development environment system, the copy processing server 100 executes a copy process of data 800 in a certain area in a file 700 stored in LU #1 and data 810 in a certain area in a file 710 stored in LU #2 to LU #4.

For the sake of simplicity, an example in which the disk control unit 900 provided for each LU 600 of the storage apparatus 500 provides the LU 600 to each application server 300 is presented in the present example. However, this configuration is not restrictive. In FIG. 1, LU #1 stores a file 700 generated by the application server 300*a* and LU #2 stores a file 710 generated by the application server 300*b*. In addition, the file 710 in LU #2 is regularly or irregularly backed up to LU #3 by the application server 300*c*.

Let us assume that the copy processing server 100 receives a copy indication in which data 800 in the file 700 in LU #1 is set as copy target data from a user. In this case, based on the copy indication by the user, the copy processing server 100 transmits, to the management server 200, a copy instruction that instructs the data 800 in the file 700 in LU #1 and data 810 in the file 710 in LU #2 which is data generated by the application server 300*b* associated with both the copy processing server 100 and the application server 300*a* and which is data associated with the data 800 to be copied to LU #4.

The management server 200 receives the copy instruction, acquires storage information and application information stored in the production environment system, and estimates a time variation in an IO (Input or Output) band usage (IO transfer rate) of a corresponding LU 600 of each application server 300. Specifically, based on the copy instruction, the management server 200 respectively estimates a time variation of IO band usage of LU #1 by the application server 300*a* and a time variation of IO band usage of LU #2 by the application servers 300*b* and 300*c*. Based on the estimations, copy start times and copying speeds of the target data 800 and 810 are respectively determined. The management server 200 transmits a copy indication including the determined copy start times and copying speeds to the copy processing server 100.

The copy processing server 100 having received the copy indication executes copy processes of the pieces of target data 800 and 810.

Due to the process described above, a copy process that reduces load on resources of a production environment system can be performed. Specifically, copy processes of the pieces of target data 800 and 810 can be respectively performed at a copy start time and a copying speed which takes into consideration not only a load (for example, IO band usage) on LU #1 storing the target data 800 by the application server 300*a* and a load (for example, IO band usage) on LU #2 storing the target data 810 by the application server 300*b* but also a load on LU #2 by the application server 300*c* that is associated with neither the copy processing server 100 nor the application server 300*b*.

Figure 2:
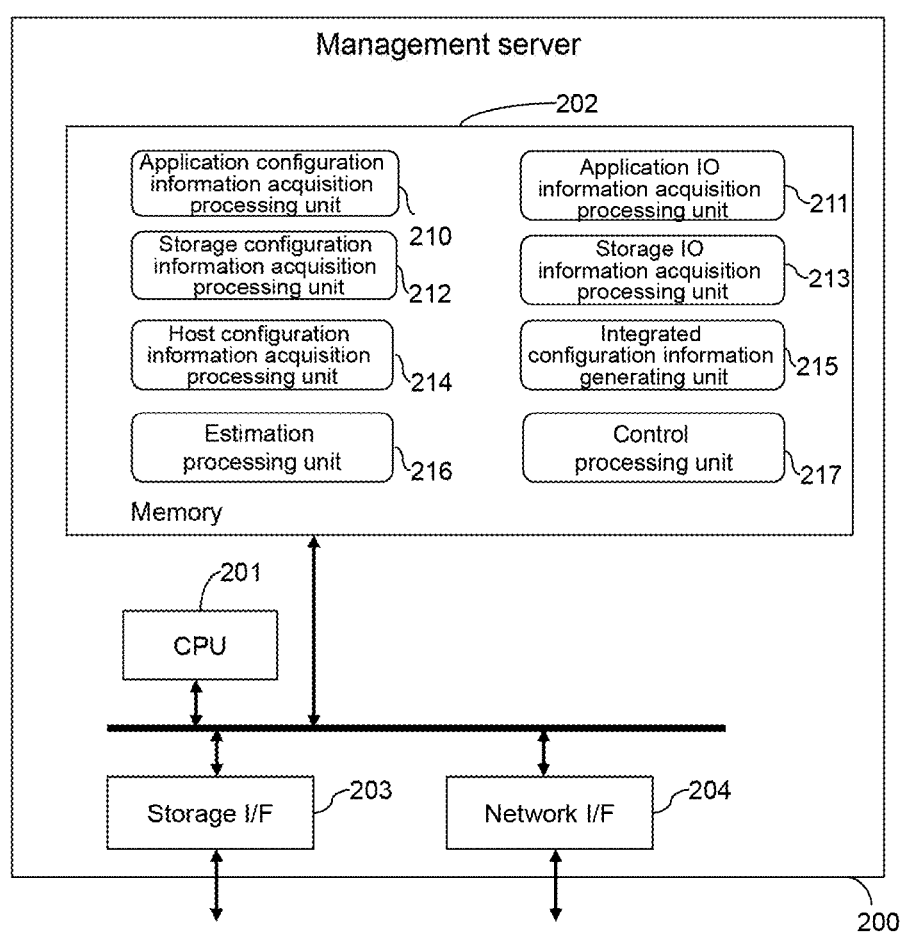
FIG. 2 is a configuration diagram of a management server 200.

FIG. 2 is a configuration diagram of the management server 200.

The management server 200 includes a processor (CPU) 201, a memory 202, a storage interface (I/F) 203 for communicating with the storage apparatus 500, and a network interface (I/F) 204 for communicating with the respective servers.

The management server 200 may additionally include interfaces (not shown) such as a keyboard, a mouse, and a display for controlling the management server 200.

The memory 202 stores computer programs to be executed by the CPU 201 as well as data. Specifically, as computer diagrams, the memory 202 stores, for example, an application configuration information acquisition processing unit 210, an application IO information acquisition processing unit 211, a storage configuration information acquisition processing unit 212, a storage IO information acquisition processing unit 213, a host configuration information acquisition processing unit 214, an integrated configuration information acquisition processing unit 215, an estimation processing unit 216, and a control processing unit 217. Hereinafter, processes executed by the respective processing units will be briefly described.

The application configuration information acquisition processing unit 210 acquires configuration information of an application from a running application server 300. The application IO information acquisition processing unit 211 acquires information on application IO band usage that indicates a load (an amount of data transferred by IO per unit time (for example, one second)) due to IO generated by the application. The storage configuration information acquisition processing unit 212 acquires internal configuration information of the storage apparatus 500 from the storage apparatus 500. The storage IO information acquisition processing unit 213 acquires information on LU IO band usage that indicates a load (an amount of data transferred by IO per unit time (for example, one second)) due to IO with respect to each storage area (for example, an LU) of the storage apparatus 500 which is stored by the storage apparatus 500. The server configuration information acquisition processing unit 214 acquires internal configuration information of the application servers 300. The integrated configuration information acquisition processing unit 215 generates information associating an application, an LU, and a scheduled application execution period with each other based on information acquired by the respective processing units 211 to 215 described above. The estimation processing unit 216 estimates a time variation of band usage for each application of a target LU at and after a time point specified by the user in a copy indication based on the respective pieces of information. The control processing unit 217 controls the entire production environment system by controlling the respective processing units 211 to 216 described above.

Figure 3:
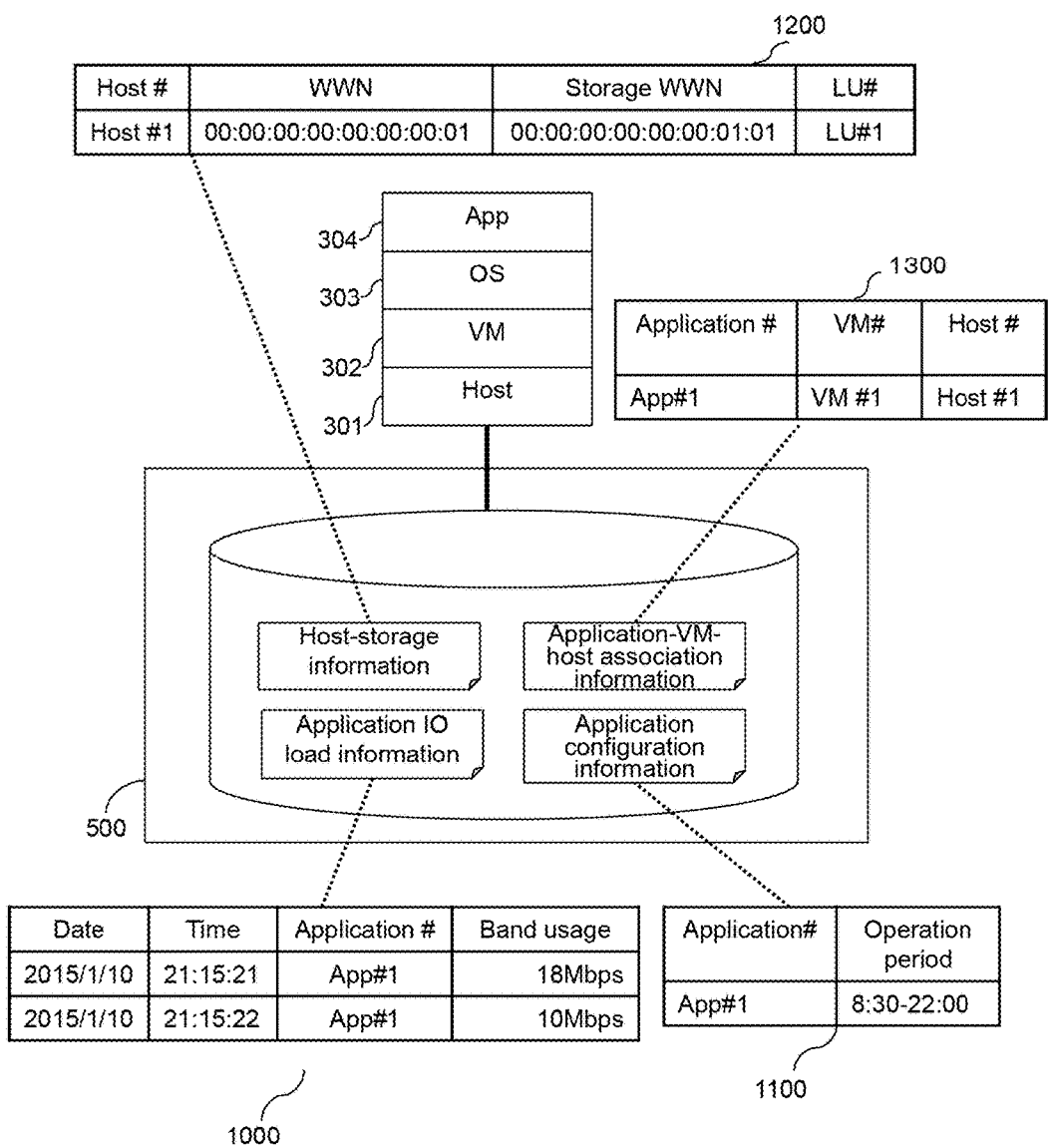
FIG. 3 is a diagram illustrating information managed by an application server 300.

FIG. 3 is a diagram illustrating information managed by an application server 300.

In the present example, the application server 300 will be described as a functional server that runs on a host 301. Moreover, the host 301 may be a physical computer or a processor inside a physical computer. Specifically, for example, it is assumed that the application server 300 is realized by having a VM (Virtual Machine) 302 run on the host 301, an OS 303 run on the VM 302, and an application 304 run on the OS 303. Therefore, in the present example, one host 301 functions as one application server 300. Alternatively, the application server 300 may be realized by having an OS run on the host 301 and an application run on the OS. Alternatively, one or a plurality of VMs 302 may run on the host 301 and a plurality of applications may run on the OS 303.

The host 301 stores information such as application IO load information 1000, application configuration information 1100, host-storage information 1200, and application-VM-host association information 1300 in an external storage apparatus or a memory inside the host 301. In the present example, the storage apparatus 500 is coupled to the host 301. In this case, the storage apparatus 500 may function as an external storage apparatus of the host 301. For example, as illustrated, the respective pieces of information 1000 to 1300 may be stored in the LU 600 inside the storage apparatus 500, stored in a memory inside a disk control unit 900, or stored in a memory shared by the respective disk control units 900. The respective pieces of information 1000 to 1300 are to be referenced by the host 301. Hereinafter, the respective pieces of information 1000 to 1300 will be described.

The application IO load information 1000 is a table that records application IO band usage at each time point.

The application IO load information 1000 includes an entry for each date and time at which an IO had occurred. Each entry includes a date and a time point at which the IO had occurred, an application # (number) that identifies the application 304 that is a request source of the IO, and band usage by the IO. Application IO band usage represents band usage (an amount of data of an IO) per unit time (one second) by an IO which is transmitted from the application 304 to the storage apparatus 500. Specifically, in the present drawing, the application IO band usage of APP #1 which had occurred at 21:15:21 on Jan. 10, 2015 is 18 Mbps.

The application configuration information 1100 is a table showing configuration information of each application 304. The application configuration information 1100 has an entry for each application 304. Each entry includes an application # (number) that identifies the application 304 and an operation period indicating a start time and an end time of an operation of the application 304 as the configuration information of the application 304. Moreover, the configuration information of the application is not limited to the above and may instead be a name of a file referenced by the application 304, a parameter for determining an operation of the application 304 other than an operation period, or the like.

The host-storage information 1200 is a table showing information on the coupling between the host 301 and the storage apparatus 500. Specifically, for example, the host-storage information 1200 includes an entry for each host 301. Each entry includes a host # (number) indicating an identifier of the host 301, a WWN (World Wide Name) that identifies the host 301, a Storage WWN that identifies the storage apparatus 500, and an LU #(number) of an LU provided to the host 301.

The application-VM-host association information 1300 is a table which associates the host 301, a VM 302 that runs on the host 301, and an application 304 that runs on the VM with each other. The application-VM-host association information 1300 includes an entry for each application 304. Each entry includes an application # (number) that is an identifier of the application 304, a VM # (number) that is an identifier of the VM 302 on which the application 304 runs, and a host # (number) that is an identifier of the host on which the VM 302 runs. Moreover, an example in which the VM 302 runs on the host 301 and the application server 300 is realized by the VM 302 on the host 301 is shown in the present example. For example, nothing is stored as the VM # if a VM 302 is not present on the host 301.

Figure 4:
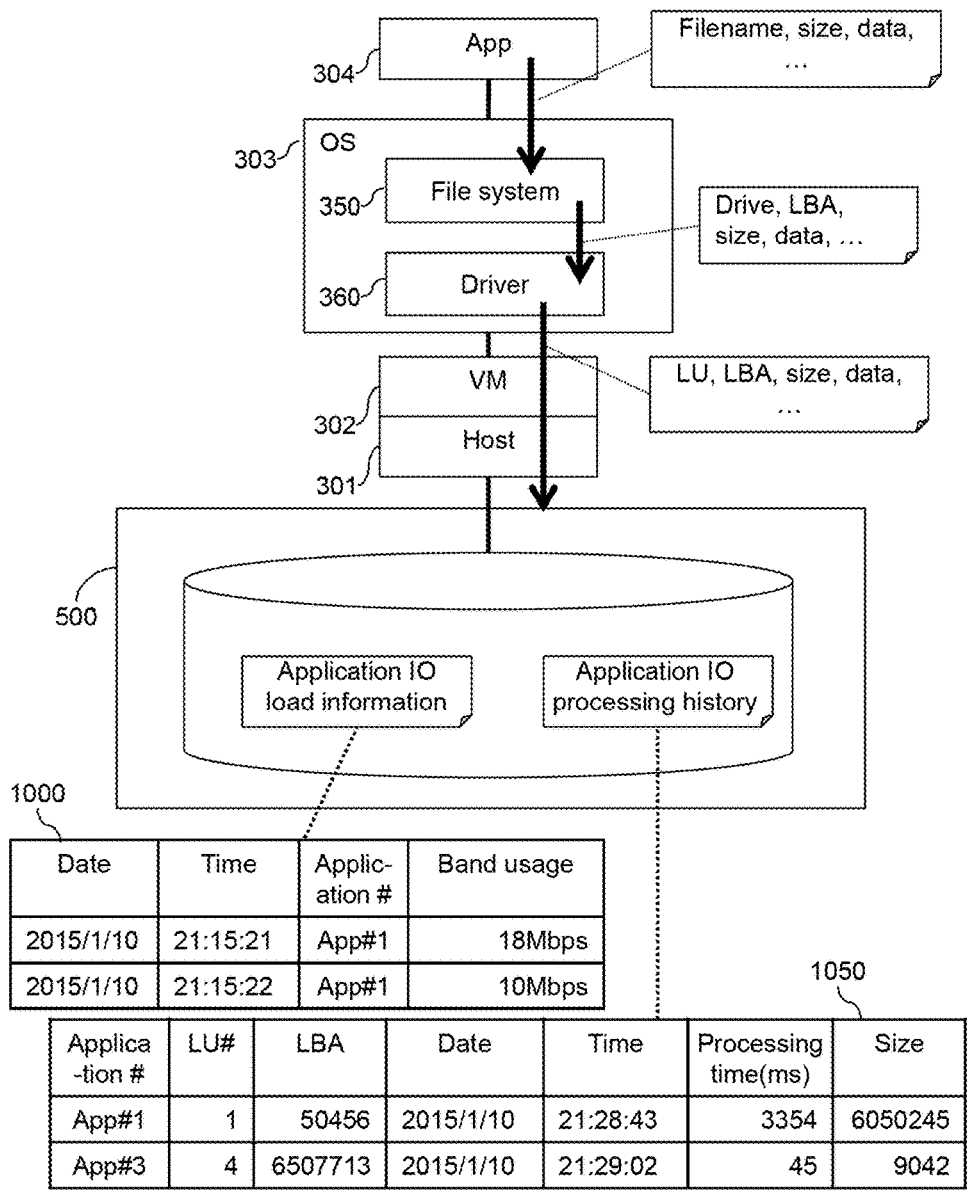
FIG. 4 is a schematic diagram showing an IO process of the application server 300.

FIG. 4 is a schematic diagram showing an IO process of the application server 300.

The application 304 is executed by the OS 303. The host 301 generates application IO processing history 1050 and generates the application IO load information 1000 described earlier based on the application IO processing history 1050. The application IO processing history 1050 is stored in a memory (not shown) inside the host 301. In the present example, the storage apparatus 500 is coupled to the host 301. Therefore, as illustrated, the application IO processing history 1050 may be stored in the LU 600 inside the storage apparatus 500, stored in a memory inside a disk control unit 900, or stored in a memory shared by the respective disk control units 900. The application IO processing history 1050 is referenced by the host 301.

The application IO processing history 1050 is a table that associates the application 304 that is a request source of the IO process with a date and time at which the request had been made and a request destination. The application IO processing history 1050 is generated by the IO process described with reference to, for example, FIG. 3. The application IO processing history 1050 retains an application having requested the IO process, an LU and an LBA representing a storage destination of target data, a date and a time point at which access to the target data had been started, a processing time indicating an amount of time required by the IO process, and a size of the target data. The respective pieces of information in the application IO processing history 1050 are acquired by a driver 360 and transmitted to a disk control unit 900 corresponding to each LU 600 to be stored in the storage apparatus 500. However, if a free area of a memory in the host 301 has sufficient capacity, the information may be stored in the memory. Moreover, the driver 360 cannot acquire information on the application 304 solely from information on a storage destination of target data which is notified from a file system 350. Therefore, at a timing where a notification of an IO process is made from the file system 350 to the driver 360, a process of the IP process is identified, a name of the application 304 is acquired from information managed by the OS 303, and information on the application 304 and information on the LU 600 are stored in association with each other. Hereinafter, a process in which application IO load information 1000 is generated will be described.

The OS 303 includes the file system 350 that realizes an IP process from the application 304 and the driver 360 that writes data onto the storage apparatus 500. For example, in response to a request for an IO process by the user or the application 304 itself, the application 304 transmits, to the file system 350, information such as a file name of a file to/from which target data is to be written/read, a size of the target data, and the target data or a location at which the target data is read. Based on the information received from the application 304, the file system 350 extracts drive information of the storage destination of the target data and notifies the drive information to the driver 360. For example, in the case of Windows (registered trademark), the drive information may be expressed as "C:" and, in the case of Linux (registered trademark), the drive information may be expressed as "/dev/hda1". The driver 360 having received the notification identifies information on an LU and an LBA representing the storage destination of the target data based on application-VM-host association information 1300, host-storage information 1200, and drive information of the storage destination of the target data, and causes a request for an IO process to be issued from the host 301 to the storage apparatus 500 according to a protocol between the host 301 and the storage apparatus 500. Based on the information obtained by the process described above, the driver 360 generates the application IO processing history 1050 which associates the application 301 and the LU 600 with each other. In addition, the driver 360 generates the application IO load information 1000 based on the application IO processing history 1050.

Figure 5:
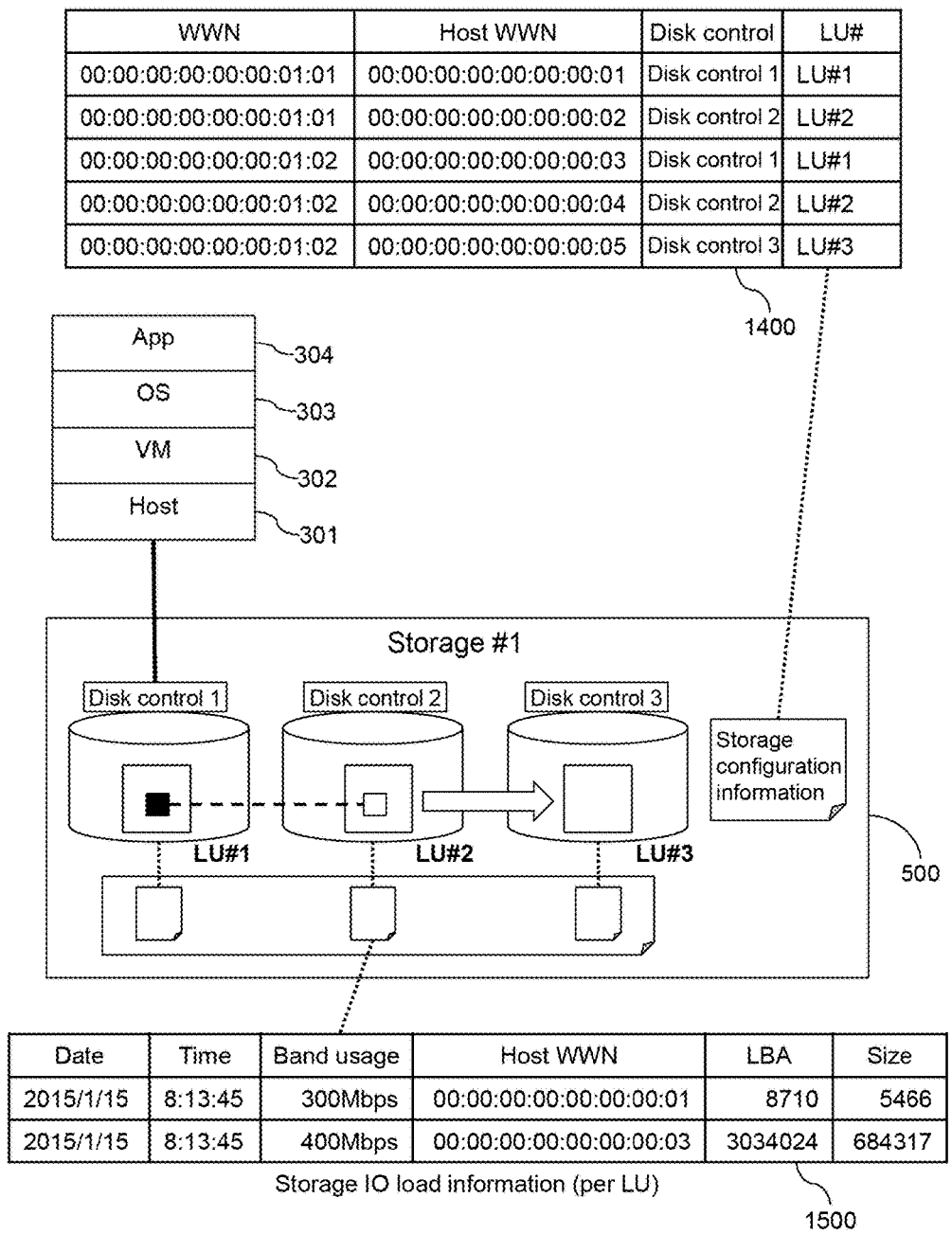
FIG. 5 shows an example of information held by a storage apparatus 500.

FIG. 5 shows an example of information held by the storage apparatus 500.

The storage apparatus 500 stores storage configuration information 1400 and storage IO load information 1500 of each LU 600. The information may be stored in each LU 600, stored in a memory inside a disk control unit 900, or stored in a memory shared by the respective disk control units 900.

The storage configuration information 1400 is a table showing a configuration of the storage apparatus 500. The storage configuration information 1400 has an entry for each host 301. Each entry includes a WWN that identifies the storage apparatus 500, a Host WWN that identifies the host 301, an LU name that identifies the LU 600, and a disk control name that identifies the disk control unit 900 controlling the LU 600.

The storage IO load information 1500 is a table that records LU IO band usage at each time point. While the storage IO load information 1500 generates a table for each LU in the present example, the storage IO load information 1500 need only store LU IO band usage. Alternatively, storage IO load information 1500 of a plurality of LUs may be stored collectively.

The storage IO load information 1500 includes an entry for each date and time at which an IO has been received by the storage apparatus 500. Each entry includes a date and a time point at which an IO intended for the LU had been received, an LU IO band usage of the LU, a Host WWN that identifies the host 301 that is a request source of the IO, an LBA that represents a destination of the IO, and a data size of the IO. LU IO band usage represents band usage (an amount of data of an IO) per unit time (one second) by an IO with the LU as its destination. In addition, when the LU is accessed by a plurality of applications, a plurality of pieces of application IO band usage are to be included in the LU IO band usage.

Moreover, information expressing coupling between devices and software such as host 301-storage information 1200 and application-VM-host association information 1300 may be dynamically confirmed when necessary.

Utilizing the information described above, a copy process with a reduced impact on the production environment system is realized. Hereinafter, a specific method of realizing such a copy process will be described.

FIG. 6 is a flow chart of an information acquisition process.

The information acquisition process is a process in which the copy processing server 100 and the management server 200 acquire and organize information necessary for realizing copying that does not affect a production environment. Hereinafter, a description will be given with reference to the drawings.

The copy processing server 100 receives a copy indication from the user (step S100). Based on the received copy indication, the copy processing server 100 identifies information on target data to be copied from the production environment system and transmits a copy instruction including the identified information on the target data and a date and time at which the copy indication had been received to the management server 200 (step S110). Moreover, examples of information on the target data include identifiers of an LU and an LBA representing a storage location of the target data and a size of the target data.

The management server 200 receives the copy instruction and identifies the LU 600 storing the target data from the information on the target data (step S120). When there are a plurality of pieces of target data, an LU storing each piece of data is identified. Hereinafter, an identified LU 600 will be referred to as a target LU.

Steps S130 to S150 represent a process of generating the integrated configuration information 1700 shown in FIG. 7. Hereinafter, the process will be described.

The management server 200 acquires storage configuration information 1400 and identifies a host 301 that provides the target LU (step S130).

The management server 200 acquires host-storage information 1200 and application-VM-host association information 1300 and identifies the application 304 using the target LU. Subsequently, based on the application configuration information 1100, the management server 200 acquires an execution period as configuration information of the identified application 304 (step S140). By organizing results obtained in this manner, the management server 200 generates integrated composition information 1700 by organizing a list of applications 304 using the target LU and configuration information of the applications 304 (step S150). The management server 200 may store the generated integrated composition information 1700 in its own memory.

In the process described above, the integrated composition information 1700 is generated based on information held by the storage apparatus 500 and information held by the host 301 coupled to the storage apparatus 500. Therefore, an execution period of the application 304 which runs on the host 301 and which has conventionally been unrecognizable by the copy processing server 100 can be linked to an LU 600 that uses the application 304.

Steps S160 and S170 represent an estimation process. A result of an estimation process (estimation result) is shown in FIG. 8. Hereinafter, the estimation process will be described.

After identifying the target LU (step S120), the management server 200 acquires storage IO load information 1500 and application IO load information 1000 as information on IO band usage regarding the target LU (step S160).

Based on the acquired storage IO load information 1500 and the application IO load 1000 and on the date and time at which the copy processing server 100 had received the copy indication, the estimation processing unit 216 of the management server 200 estimates a time variation of IO band usage of each application 304 using the target LU for a period from the time point at which the copy indication had been received to after a lapse of a prescribed amount of time (step S170). An estimation result 1800 of LU #1 is shown in FIG. 8. By performing the estimation process, an estimation result of a time variation in IO band usage per application can be generated for each LU. The management server 200 may store the generated estimation result 1800 in its own memory.

The management server 200 executes a copy method determination process of data from the production environment system to the development environment system (step S180). For the copy process, the management server 200 uses the integrated configuration information 1700 generated in steps S130 to S150 and the estimation result generated in steps S160 and S170.

Moreover, in the process described above, after the management server 200 receives a copy instruction from the copy processing server 100 and identifies a target LU, the management server 200 collects information from the host 301 and the storage apparatus 500. However, the management server 200 may collect the information before accepting a request from the copy processing server 100. In this case, the management server 200 may generate necessary information from data already collected by using the copy instruction from the copy processing server 100 as a trigger.

There are several conceivable methods of performing a copy process. Examples of copy processing methods include a first copy processing method in which a copy process is executed during a period when the application 304 is not running, a second copy processing method in which an unused band is used for a copy process when there is a margin in the band of the production environment system, and a third copy processing method in which a timing of a process of an application using the target LU is staggered or the process is aborted. Any of these methods may be selected as the copy processing method. The management server 200 determines whether or not a selected copy processing method is appropriate according to a copy process determination method described below. Hereinafter, the first copy processing method and a copy process determination method relating to the first copy processing method will be described.

Figure 9:
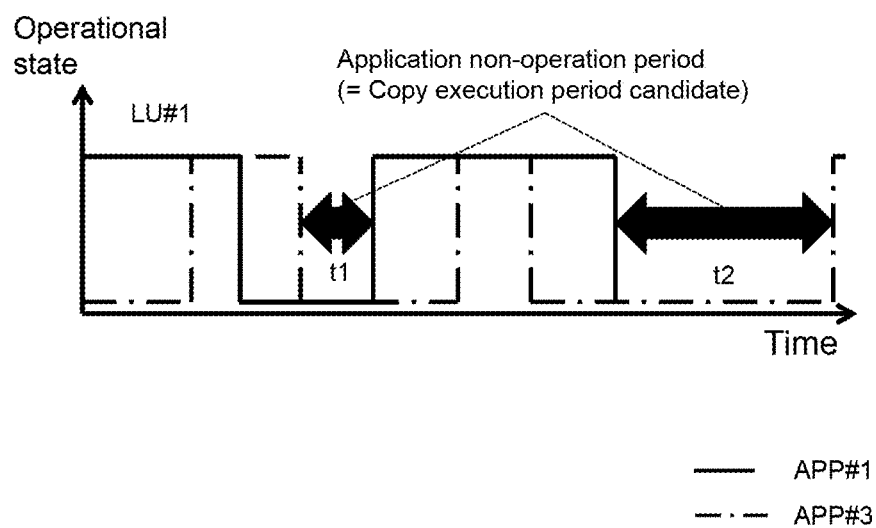
FIG. 9 is a diagram illustrating a first copy process.

FIG. 9 is a diagram illustrating a first copy processing method. The drawing shows that, in the production environment system, two applications 304 designated as APP #1 and APP #3 are running on the target LU (LU #1). In this case, it is assumed that APP #1 is an application 304 that uses the target data and APP #3 is an application 304 not associated with APP #1. In the drawing, periods t1 and t2 in which neither of the two applications (APP #1, APP #3) are running or, in other words, periods t1 and t2 in which LU #1 is not subjected to loads due to IO from the APP #1 and APP #3 are application non-operation periods of LU #1. Based on the integrated configuration information 1700, the management server 200 estimates an application non-operation period and determines a period for executing a copy process (a copy processable period) based on the estimated application non-operation period. Accordingly, a copy process can be performed which takes load on the target LU due to IO by a plurality of applications 304 into consideration. Therefore, a copy process with a reduced impact on resources of the production environment system used by the applications can be performed. in addition, in doing so, load due to IO by an application 304 which uses the target data and which is not associated with the copy processing server 100 can also be taken into consideration.

Figure 10:
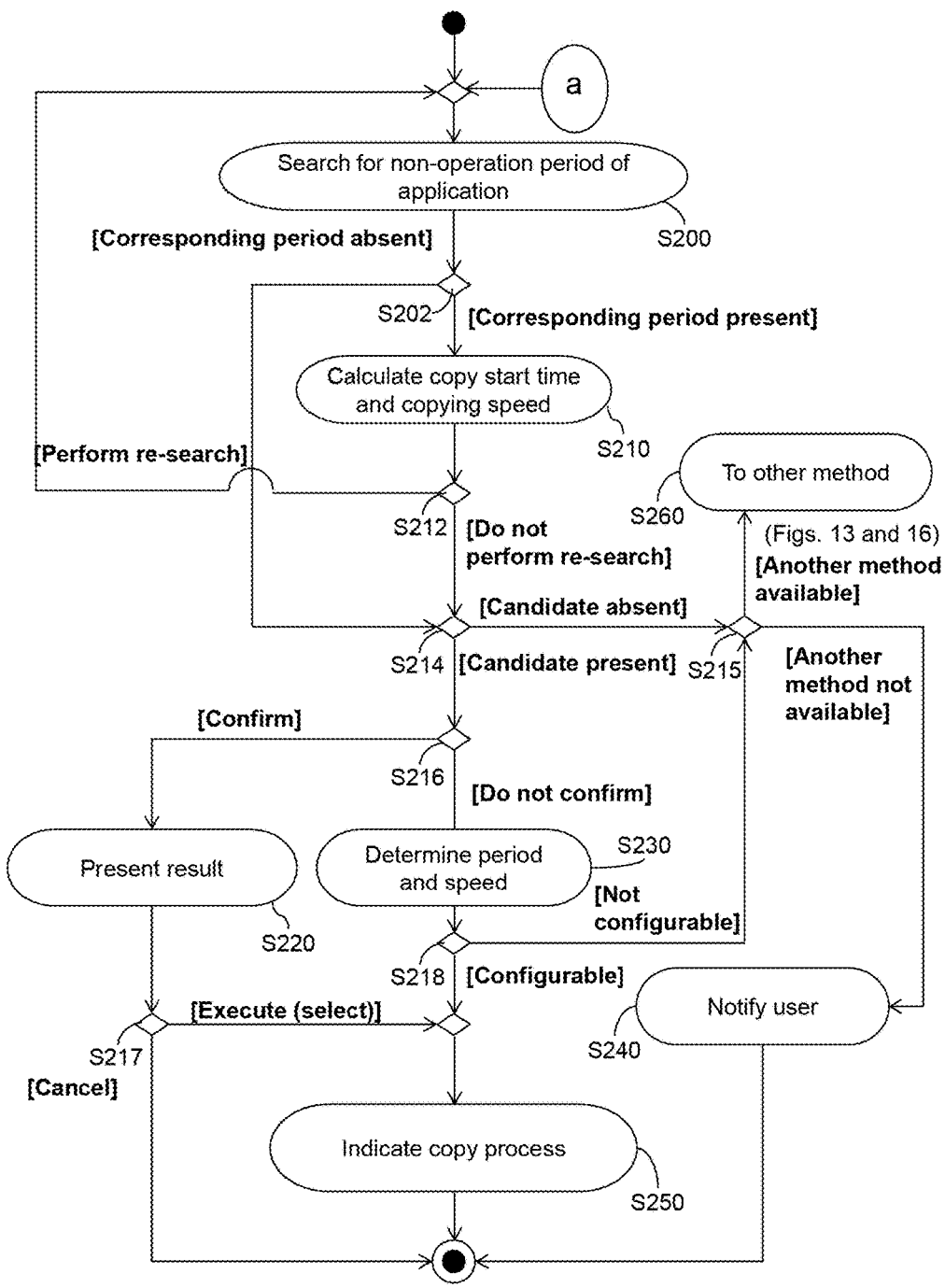
FIG. 10 is a flow chart of a first copy method determination process.

FIG. 10 is a flow chart of a first copy method determination process.

The first copy method determination process preferentially uses the first copy processing method. In other words, the first copy method determination process mainly determines whether or not the first copy processing method is executable. The management server 200 acquires integrated configuration information 1700 and searches for a period in which applications that access a target LU that is a target of the copy process are not running from a startup timing of the applications (step S200). Specifically, for example, a search is performed regarding whether or not an application non-operation period in which none of the applications 304 are running is present within a range that is searchable from a time point at which the user had issued a copy indication. Based on the result of the search, the management server 200 determines whether or not an application non-operation period is present (step S202).

A result of the determination indicating that an application non-operation period is absent (S202: corresponding period absent) means that the application is constantly running and that the first copy processing method cannot be applied. Therefore, the management server 200 advances the process to step S214. On the other hand, as a result of the determination, when an application non-operation period is present (S202: corresponding period present), the management server 200 acquires the application non-operation period and calculates a copying speed thereof (step S210). Specifically, for example, the management server 200 searches for a start time of a next access to the target LU by the application 304 based on the integrated configuration information 1700 and extracts a period having a time point immediately preceding the start time of the next access as an end time of a copy process. In addition, based on the extracted period and the size of the target data notified by the copy processing server 100 in the information acquisition process, the management server 200 determines whether or not the copy process can be completed within the extracted period. When the copy process can be completed, the management server 200 assumes the period to be a candidate of a copy processable period and determines a copying speed that enables the copy process to be completed within the period. For example, the copying speed may be a minimum speed that enables all target data to be copied within the candidate of a copy processable period. Moreover, when there are a plurality of pieces of target data, the management server 200 may determine whether or not copy processes can be consecutively completed for the plurality of pieces of target data, and when a candidate for a copy processing period is present, the management server 200 may determine a copying speed that enables copy processes of the plurality of pieces of target data to be completed within the period based on a total size of the plurality of pieces of target data. Examples of cases where there are a plurality of pieces of target data include a case where there are a plurality of pieces of data included in the copy indication from the user and a case where there are data associated with one target that is included in the copy indication from the user.

The management server 200 determines whether or not a re-search is necessary (step S212). A re-search may be performed in, for example, a searchable range configured by the user. When a re-search is to be performed (S212: perform re-search), the management server 200 returns the process to S200. When a re-search is not to be performed (S212: do not perform re-search), the management server 200 advances the process to S214. Due to the re-search, a determination is made on whether or not all non-operation periods in the searchable range can be candidates of a copy processable period, and a copy start time and a copying speed are calculated for periods that can be candidates. For example, in the example shown in FIG. 9, the management server 200 calculates a copy start time and a copying speed of target data for candidates (t1 and t2) of a copy processable period in the searchable range.

The management server 200 determines whether or not one or more candidates of a copy processable period have been acquired (step S214). When a candidate of a copy processable period has not been acquired (S214: processing period candidate absent), the management server 200 determines whether or not another copy method determination process can be performed (step S215). When another copy method determination process can be performed (S215: another method available), the management server 200 executes another copy method determination process to be described later. On the other hand, when another copy method determination process cannot be performed (S215: another method not available), the management server 200 notifies the user that a period that enables a copy process to be executed is not present (step S240) and ends the process. The other copy method determination process will be described in detail in subsequent examples.

Figure 11:
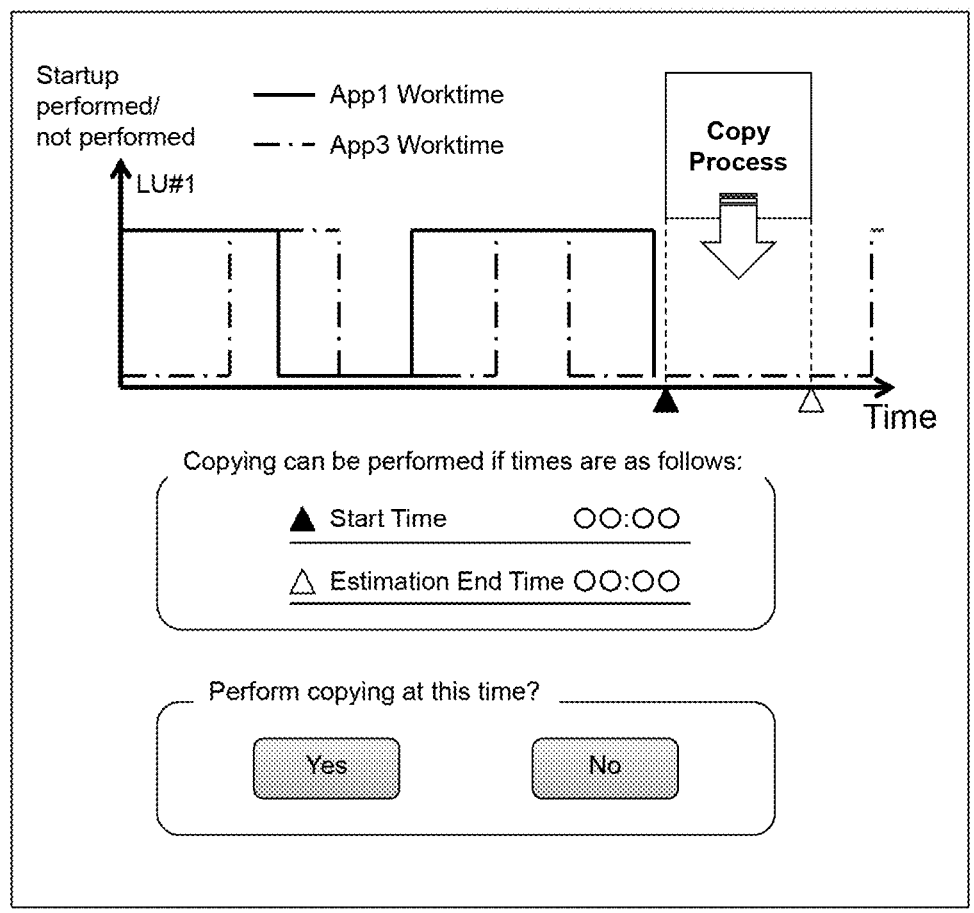
FIG. 11 shows an example of a presentation screen of a result of the first copy method determination process.

Meanwhile, when one or more candidates of a copy processable period are acquired (step S214: candidate present), the management server 200 determines whether or not results of the copy start time and the copying speed of the period (or periods) are to be confirmed by the user (step S216). When the results are to be confirmed by the user (S216: confirm), the management server 200 presents the results to the user (step S220). An example of a result presentation screen is shown in FIG. 11. A time slot in which APP #1 to APP #3 using the target LU do not run is considered a copy processable period (copy process), and a start time of a copy process when the copy process is performed at the calculated copying speed in the copy processable period and an estimated end time when executing the copy process at the calculated copying speed are presented. The user selects whether or not to perform a copy process in the time slot presented on the screen.

When the result is not confirmed with the user (S216: do not confirm), the management server 220 automatically determines a copy start time and a copying speed (step S230). Several examples of criteria of determining a copy start time and a copying speed will now be shown. According to a first criterion, for example, the calculated copying speed is within a range that can be assumed by the storage apparatus 500. According to a second criterion, for example, when the user has configured conditions such as a start time, an end time, and a speed of the copy process in advance using a configuration file or the like, the conditions are not violated. According to a third criterion, when there are conditions such as a start time, an end time, and a speed of the copy process specified by the user when issuing a copy indication, the conditions are not violated. When any of the first to third criteria is violated (S218: not configurable) and another copy method determination process cannot be performed (S215: another method not available), the management server 200 notifies the user that the target data cannot be copied using the copy processing method according to the present example and ends the process (step S240). Meanwhile, when any of the criteria is violated (S218: not configurable) and another copy method determination process can be performed (S215: another method available), the management server 200 executes the other copy method determination process to be described later. Alternatively, the management server 200 may be non-configurable even when all of the first to third criteria are violated in S218.

On the other hand, when the first to third criteria are satisfied (S218: configurable), the management server 200 executes a copy process of the first method at the automatically-determined start time and the copying speed of the copy process (step S250). Moreover, the management server 200 may be configurable when one or more of the first to third criteria are satisfied in S218.

With respect to a display of a result in S220, when the user issues an indication not to perform the copy process (S217: cancel), the management server 200 ends the copy process. On the other hand, when the user issues an indication to execute the copy process (S217: execute (select)), the management server 200 transmits the indication for execution of the copy process to the copy processing server together with information including the start time and the copying speed of the copy process confirmed (or specified) by the user (step S250) and ends the process.

After the process described above, when the copy processing server 100 receives the indication for execution of the copy process in S250, the copy processing server 100 executes the copy process at the specified start time and the copying speed of the copy process. Specifically, for example, when the copy processing server 100 receives the indication for execution of the copy process in S250, the copy processing server 100 may identify a copy source and a copy destination of the target data, read the target data from the copy source, and transmit the target data to the copy destination, or the copy processing server 100 may transmit a copy instruction including information on the target data such as information on the copy source and the copy destination to the storage apparatus 500 that is the copy source or the copy destination of the target data.

In addition, as another method, the process may be advanced to step S220 or step S230 once one candidate of a copy processable period is acquired. In this case, a specific processing method is defined according to re-search conditions. In a similar manner, the calculation of a copying speed in S210 may also be performed at the timing of step S220 or step S230.

Due to the process described above, in a period in which the applications 304 using the target LU are not running, a copy process of target data from the production environment system to the development environment system can be performed at an appropriate copying speed that conforms to the period. Accordingly, the impact of the copy process to the production environment system can be reduced in consideration of a load due to an IO by the applications on resources included in the production environment system.

In addition, by having the management server 200 transmit a copy indication including a start time and a copying speed of a copy process of target data to the copy processing server 100, the copy processing server 100 can execute a copy process of the target data without additional functions.

Example 2

Hereinafter, Example 2 will be described. The following description will focus on differences from Example 1 and portions that overlap with Example 1 will be omitted or simplified. In Example 2, a different copy processing method from Example 1 is performed.

Figure 12:
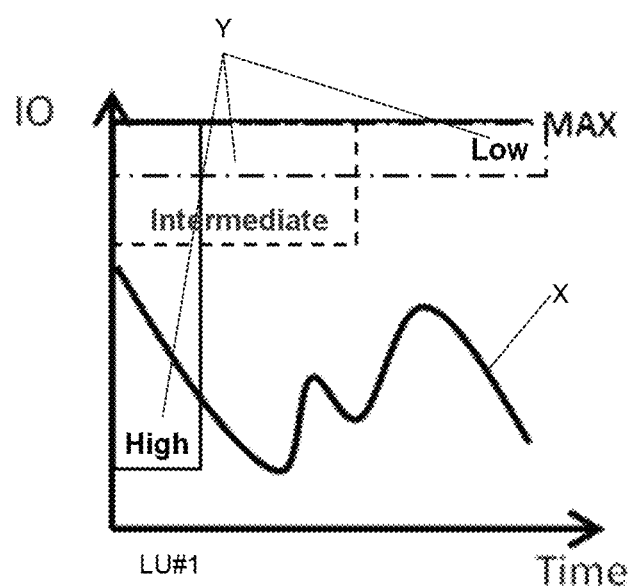
FIG. 12 is a diagram illustrating a second copy process.

FIG. 12 is a diagram illustrating a second copy process.

The second copy process is a method in which, when there is a margin in the IO band usage of an LU 600 by an application, the unused band is used for the copy process. This method is premised on the priority of the copy process set lower than other applications using the LU 600 and on the copying speed fluctuating constantly to prevent an end time of the copy process from being reliably estimated. Alternatively, this method may be premised on the copy process fixedly using a band for its own processing without being aware of other applications. In the present example, when copying speed is to be switched among several stages, a specific case where the copying speed is switched among three stages including high speed, intermediate speed, and low speed will be described. Moreover, each stage of the copying speed may be configured in advance and managed by the management server 200. Specifically, for example, each stage of the copying speed may be stored in a memory of the management server 200, a memory of the storage apparatus 500, or the LU 600.

In the drawing, a horizontal axis represents time and a vertical axis represents band usage. X denotes an estimated value of band usage (IO band usage) at each time point due to IO by an application to a target LU as generated by the estimation processing unit 216. In the present drawing, the target LU is designated LU #1. Specifically, for example, the IO band usage is band usage due to IO by all applications using the target LU regardless of whether the applications are applications 304 associated with the copy processing server 100 or not. In addition, a maximum value (MAX) of LU band usage that can be used with respect to the target LU is set as a reference. Y denotes a relationship between a copy processing period and band usage of a copy process (copy band usage) at each copying speed when the copy process is performed with respect to target data in the target LU. Specifically, for example, with respect to the target data, Y shows a relationship between copy band usage and a copy processing period when performing the copy process at high speed as "high", a relationship between copy band usage and a copy processing period when performing the copy process at intermediate speed as "intermediate", and a relationship between copy band usage and a copy processing period when performing the copy process at low speed as "low". In this case, at each time point, a sum of copy band usage when performing a copy process of target data at each copying speed and estimated IO band usage must be configured so as not to exceed LU band usage (MAX) that is usable by the target LU. For example, in the example of the present drawing, a copy process of target data cannot be performed at high speed. On the other hand, a copy process of target data can be performed at intermediate and low speeds.

Accordingly, a copy process can be performed which takes IO load on the target LU by the applications 304 into consideration. In this case, load due to IO by not only applications associated with the copy processing server 100 but also applications 304 not associated with the copy processing server 100 can be taken into consideration.

Figure 13:
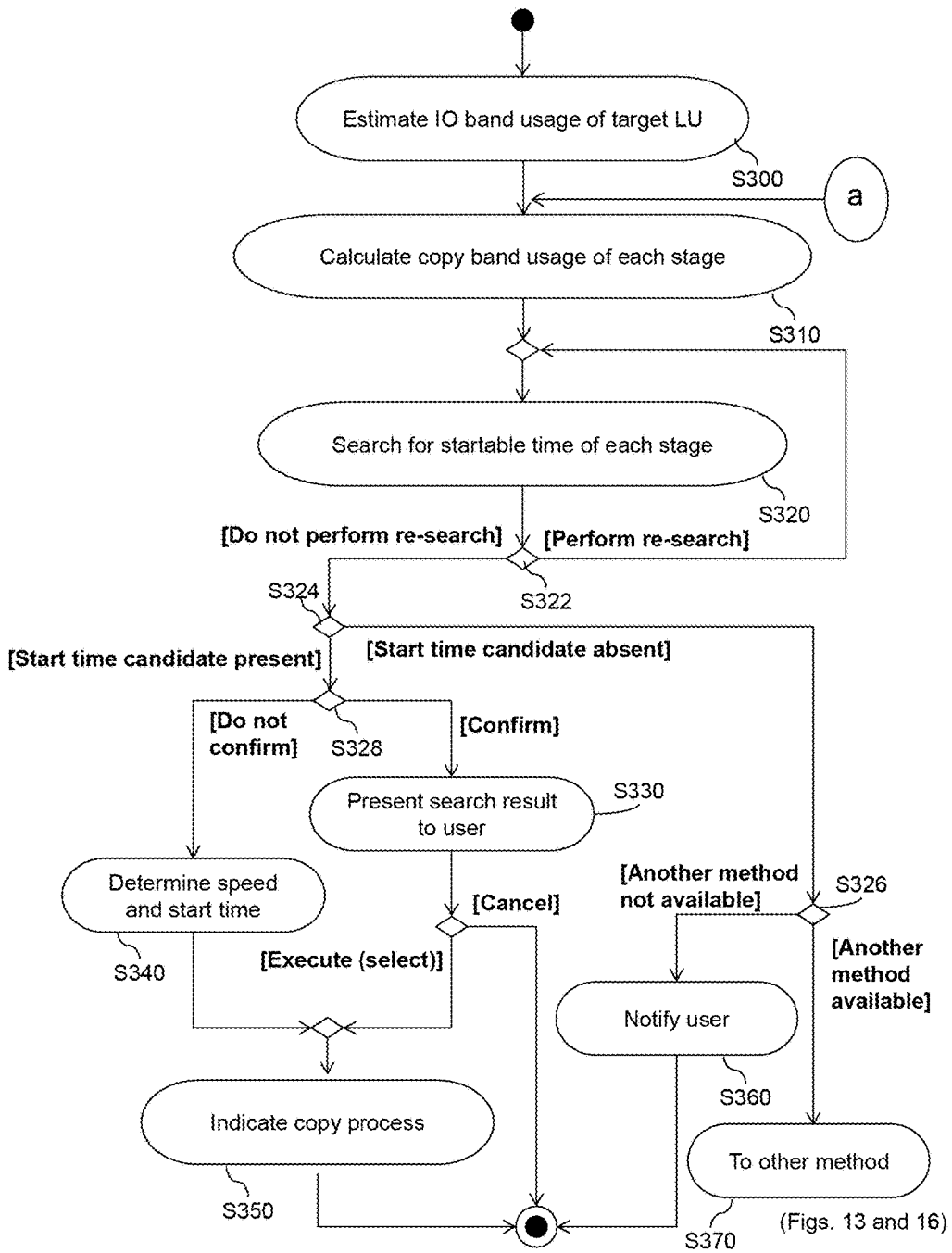
FIG. 13 is a flow chart of a second copy method determination process.

FIG. 13 is a flow chart of a second copy method determination process.

The copy method determination process preferentially uses the second copy processing method. In other words, the second copy method determination process mainly determines whether or not the second copy processing method is executable. The management server 200 estimates band usage due to IO (IO band usage) of the target LU from information on target data included in the copy instruction (refer to S110 in FIG. 6) notified by the copy processing server 100, storage IO load information 1500, and application IO load 1000 (step S300).

Based on a copying speed configured per stage and a size of the target data included in the information on the target data, the management server 200 calculates a copy processing period and band usage of a copy process (copy band usage) necessary in each stage of the copying speed (step S310). As a result of this step, for example, Y ("high", "intermediate", and "low") shown in FIG. 12 is determined.

The management server 200 searches for a start time that enables the copy process to be performed for each stage of the copying speed (step S320). Specifically, for example, the management server 200 first arranges respective stages (high, intermediate, and low) of Y so as to contact an axis of a maximum value (MAX) of LU band usage of the target LU and to contact an axis of a current time point (Time=0) (refer to FIG. 12). Next, the management server 200 performs a search while moving the respective stages (high, intermediate, and low) of Y in parallel so as not to intersect IO band usage (X) at each estimated time point in FIG. 12. This process is repetitively performed under necessary conditions and for a necessary number of repetitions based on, for example, configuration information (not shown) configured by the user. When performing a search once again (S322: perform re-search), the management server 200 searches for a start time that can be selected for each stage. Moreover, the configuration information may be specified by the user via a GUI during the information acquisition process and stored. In addition, the re-search may be configured so as to end upon selection of a copying speed and a copy processing period which ends before a copy processing period in a case where the "low" stage is selected. On the other hand, when a re-search is not to be performed (S322: do not perform re-search), the management server 200 advances the process to step S324.

The management server 200 determines whether or not a candidate of a start time that enables a copy process to be performed is present (step S324). When a candidate of a start time is not present (S324: start time candidate absent), the management server 200 determines whether or not another copy method determination process can be performed (step S326). When another copy method determination process cannot be performed (step S326: another method not available), the management server 200 notifies that a candidate of a start time is absent in all stages together with a reason therefor to the user (step S360) and ends the process. When another copy method determination process can be performed (step S326: another method available), a copy method determination process according to another example is performed (step S370).

Figure 14:
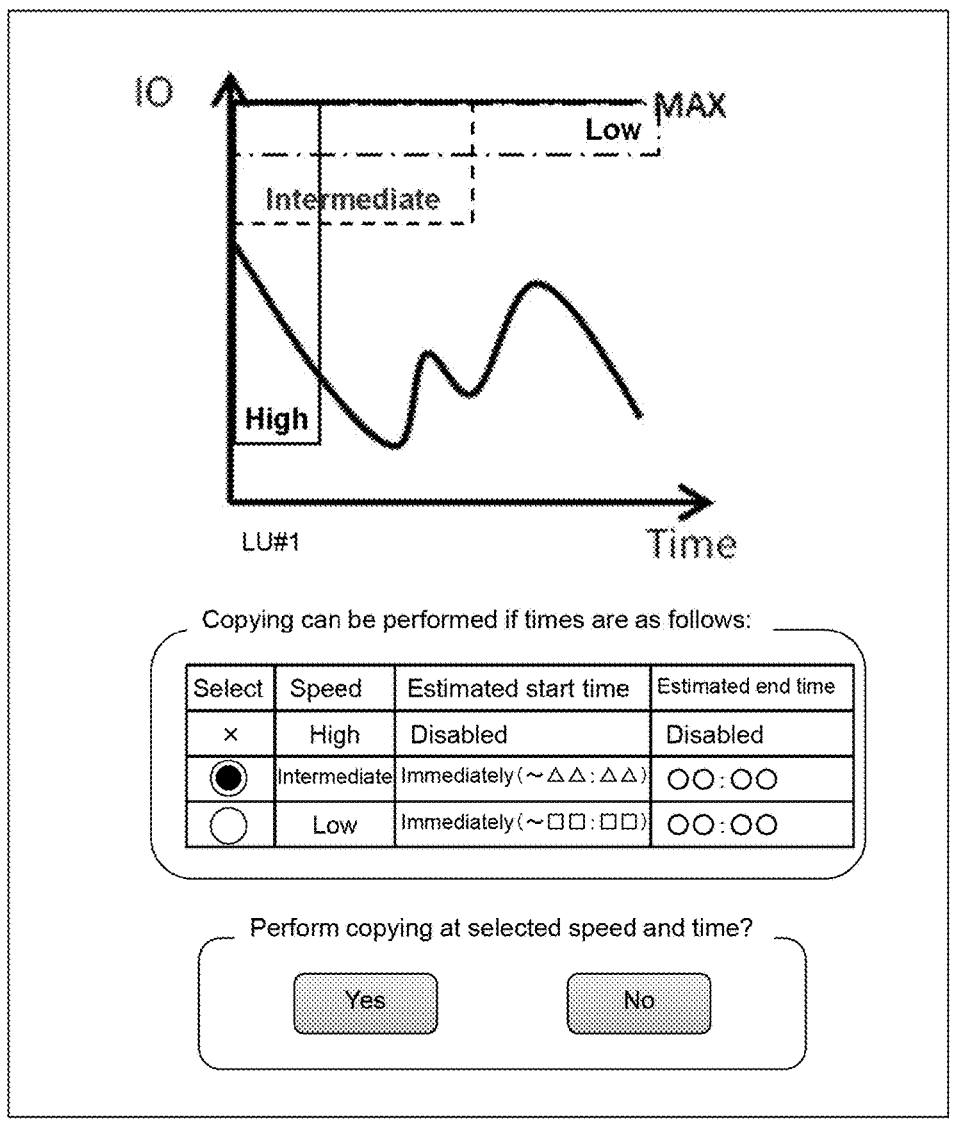
FIG. 14 shows an example of a presentation screen of a result of the second copy method determination process.

The management server 200 determines whether or not the result of the search is to be confirmed with the user (step S328). When the result is to be confirmed by the user (S328: confirm), the management server 200 presents the search result to the user (step S330). Options of copy processable periods and copying speeds are presented as the search result. An example of a search result presentation screen is shown in FIG. 14. For a copying speed of each stage, whether or not a copy process can be selected is shown. In addition, with respect to stages for which a copy process can be selected, an estimated start time of the copy process in the copy processable period and an estimated end time when the copy process is performed at the copying speed in the copy processable period are shown. The user specifies a copying speed of a selectable stage and selects whether or not to perform a copy process at the copying speed of the specified stage. When the user does not select to perform a copy process (S332: cancel), the management server 200 ends the process. When the user selects to perform a copy process (S332: select), the management server 200 advances the process to S350.

When the result is not to be confirmed with the user (S328: do not confirm), the management server 220 automatically determines a start time of the copy process and a stage of the copying speed (step S340) and advances the process to S350. The start time of a copy process and the stage of the copying speed may be defined by the production environment system as a service or may be determined according to any criteria such as causing the copy process to end within a limitation period specified by the user or causing the copy process to end soonest.

The management server 200 transmits an indication for execution of a copy process together with information including the start time of the copy process and the copying speed confirmed (or specified) by the user to the copy processing server (step S350) and ends the process.

After the process described above, when the copy processing server 100 receives the indication for execution of the copy process in S350, the copy processing server 100 executes the copy process at the specified start time and the copying speed. Specifically, for example, when the copy processing server 100 receives the indication for execution of the copy process in S350, the copy processing server 100 may identify a copy source and a copy destination of the target data, read the target data from the copy source, and transmit the target data to the copy destination, or the copy processing server 100 may transmit a copy instruction including information on the target data such as information on the copy source and the copy destination to the storage apparatus 500 that is the copy source or the copy destination of the target data.

Due to the process described above, in a period (a copy processable period) in which there is a margin in the LU band usage of the target LU, a copy process of target data from the production environment system to the development environment system can be performed at an appropriate copying speed that conforms to the copy processable period. Accordingly, the impact of the copy process on resources of the production environment system can be reduced.

In addition, by having the management server 200 transmit a copy indication including a start time and a copying speed of a copy process of target data to the copy processing server 100, the copy processing server 100 can execute a copy process of the target data without additional functions.

Example 3

Hereinafter, Example 3 will be described. The following description will focus on differences from Examples 1 and 2 and portions that overlap with Examples 1 and 2 will be omitted or simplified. In Example 3, a different copy processing method from Examples 1 and 2 is performed.

Figure 15:
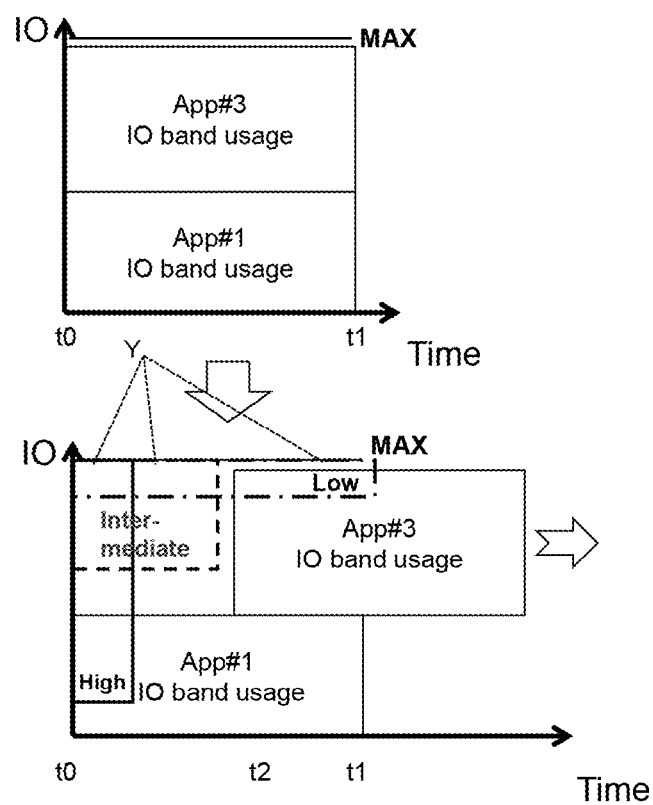
FIG. 15 is a diagram illustrating a third copy processing method.

FIG. 15 is a diagram illustrating a third copy processing method. The third copy processing method is a method in which an execution period of an application using a target LU is staggered or execution of the application is aborted. An upper diagram in FIG. 15 shows that APP #1 and APP #3 are running with respect to the target LU and that a total value of IO band usage of the target LU by the applications 304 at each time point is approximately equal to a maximum value (MAX) of LU band usage of the target LU. In addition, in the period (t0→t1) shown, the applications (APP #1 and APP #3) are continuously running. Furthermore, it is assumed that APP #1 is an application that uses target data and APP #3 is an application that is not associated with APP #1. In such a case, if an execution period of one of the applications can be staggered, a copy process can be executed using a band of the staggered period. Meanwhile, some applications allow their execution periods to be staggered while some do not. In this case, it is assumed that APP #1 is an application that does not allow its execution period to be staggered or its execution to be aborted. On the other hand, since APP #3 is an application that executes a backup process, it is assumed that an execution period thereof can be staggered. In this case, as shown in a lower diagram in FIG. 15, the execution period of APP #3 can be staggered and a copy process can be executed in the staggered period. In the example shown in the present drawing, a copy process at high speed (copying speed "high") cannot be selected for the target data. This is because, if the copy process is to be executed at high speed, a sum of copy band usage and IO band usage by APP #1 at each time point exceeds the maximum value (MAX) of the LU band usage that is usable by the target LU. In this case, by staggering a start time of APP #3 from t0 to t2, "intermediate" can now be selected as the copying speed of the target data. Accordingly, a copy process can be performed which takes a load due to IO on the target LU by the applications 304 into consideration. In this case, load due to IO by not only applications associated with the copy processing server 100 but also applications 304 not associated with the copy processing server 100 can be taken into consideration.

Figure 16:
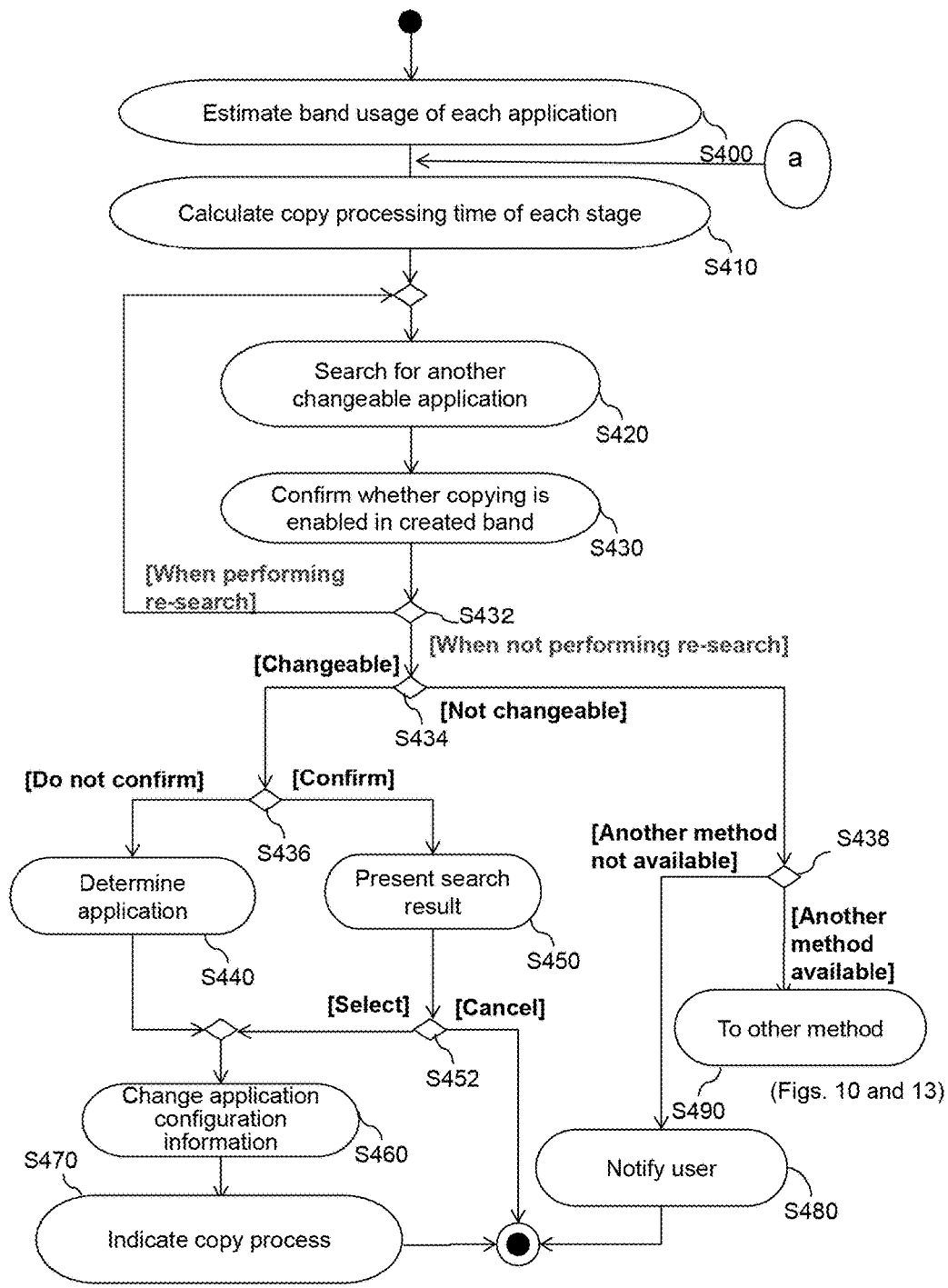
FIG. 16 is a flow chart of a third copy method determination process.

FIG. 16 is a flow chart of a third copy method determination process.

The third copy method determination process preferentially uses the third copy processing method. In other words, the third copy method determination process mainly determines whether or not the third copy processing method is executable. The management server 200 estimates band usage due to IO (IO band usage) of the target LU for each application from information on target data included in the copy instruction (refer to S110 in FIG. 6) notified by the copy processing server 100, storage IO load information 1500, and application IO load 1000 (step S400) (refer to upper diagram in FIG. 15). The estimated values may be, for example, the values shown in FIG. 8.

Based on a copying speed configured per stage and a size of the target data included in the information on the target data, the management server 200 calculates a copy processing period and band usage of a copy process (copy band usage) necessary in each stage of the copying speed (step S410). As a result of this step, for example, respective stages (high, intermediate, and low) of Y in the lower diagram in FIG. 15 are determined.

The management server 200 searches for an application 304 that allows its execution period to be changed among applications 304 using the target LU (step S420). An application 304 that allows its execution period to be changed may be determined according to, for example, priorities or limitation information (not shown) of the applications 304 configured in advance. As limitation information of applications, for example, operations of business applications such as those used by end customers may be disabled from being stopped or delayed while stopping and delaying of operations of applications for backup process may be enabled. Moreover, priorities and limitation information may be stored in advance as a configuration file in a memory of the management server 200 or may be specified by the user. Alternatively, instead of performing this step, the management server 200 may create and present a list of proposed changes to copy processing periods that do not take priorities and limitation information into consideration and have the user determine a copy processing period of the target data when performing a copy process.

The management server 200 confirms whether copy band usage of the target data can be secured within a period secured by changing the execution period of the searched application (step S430). These processes are repetitively performed under necessary conditions and for a necessary number of repetitions based on configuration information. The configuration information may be specified by the user via a GUI during the information acquisition process and stored or may be defined in advance. When a re-search is to be performed (S432: perform re-search), the management server 200 returns the process to S420.

As a result of the search, when an application whose execution period can be changed is absent (S434: not changeable), the management server 200 determines whether or not there is another copy processing method (step S438). When there is no other copy processing method (S438: another method not available), the management server 200 notifies the user that none of the execution periods of the applications are changeable and, when a period with a margin corresponding to copy band usage of the target data could not be secured, the management server 200 notifies the user of a reason therefor (step S480), and ends the process. When there is another copy processing method (S438: another method available), a copy processing method according to another example is executed.

Figure 17:
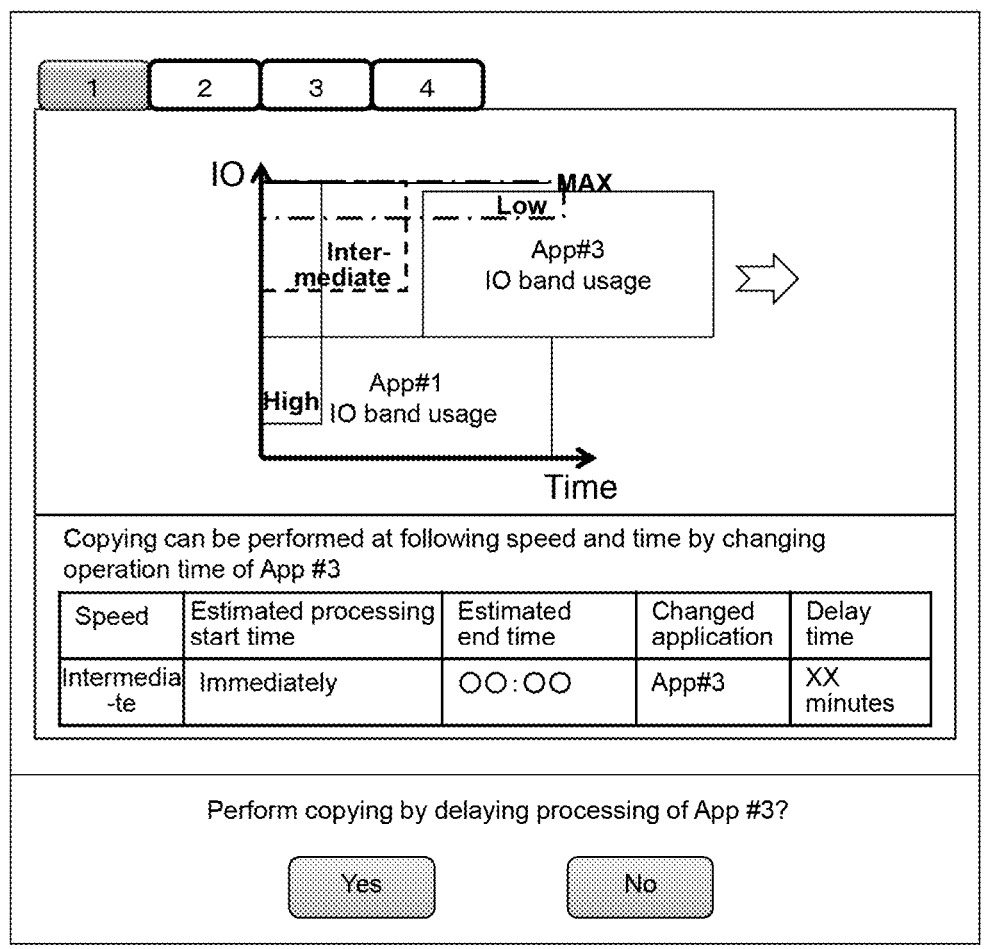
FIG. 17 shows an example of a presentation screen of a result of the third copy method determination process.

The management server 200 determines whether or not the result of the search is to be confirmed with the user (step S436). When the result is to be confirmed by the user (S436: confirm), the management server 200 presents the search result to the user (step S450). An example of a search result presentation screen is shown in FIG. 17. In this example, APP #3 is shown as an application whose execution period is changeable. By staggering the execution period of APP #3, a copy process of the target data at intermediate speed (copying speed "intermediate") can be realized. The user selects whether or not to perform a copy process at the specified copying speed (intermediate). When the user does not select to perform a copy process (S452: cancel), the management server 200 ends the process. When the user selects to perform a copy process (S452: select), the management server 200 advances the process to S460.

When the result is not to be confirmed with the user (S426: do not confirm), the management server 220 determines an application 304 whose execution period is to be automatically changed from the searched applications 304 whose execution periods are changeable (step S440), and advances the process to step S460. Examples of a method of determining an application 304 whose execution period is to be automatically changed includes confirming a constraint defined in advance and confirming whether an SLA can be kept.

The management server 200 temporarily changes the execution period of the user-specified or automatically-determined application 304 (step S460). For example, the management server 200 may configure the application 304 so that a start time of the application 304 is staggered by a specified time or a start of execution of the application 304 is triggered by the end of a copy process of target data.

The management server 200 transmits an indication for execution of a copy process together with information including the start time of the copy process and the copying speed confirmed (or specified) by the user to the copy processing server (step S470) and ends the process.

After the process described above, when the copy processing server 100 receives the indication for execution of the copy process in S470, the copy processing server 100 executes the copy process at the specified start time and the copying speed of the copy process. Specifically, for example, when the copy processing server 100 receives the indication for execution of the copy process in S470, the copy processing server 100 may identify a copy source and a copy destination of the target data, read the target data from the copy source, and transmit the target data to the copy destination, or the copy processing server 100 may transmit a copy instruction including information on the target data such as information on the copy source and the copy destination to the storage apparatus 500 that is the copy source or the copy destination of the target data.

Due to the process described above, when there is no margin in the LU band usage of the target LU, by changing an execution period of the application 304 using the target LU, IO band usage of the target LU by the application can be reduced and a period with a margin in the LU band usage can be created, and a copy process of target data from the production environment system to the development environment system can be performed at an appropriate copying speed that conforms to the created period. Accordingly, the impact of the copy process on resources of the production environment system can be reduced.

In addition, by having the management server 200 transmit a copy indication including a start time and a copying speed of a copy process of target data to the copy processing server 100, the copy processing server 100 can execute a copy process of the target data without additional functions.

The first to third copy processing methods have been described above. Using these copy processing methods enable a copy process to be performed while taking into consideration operations of applications which were conventionally not recognizable by the copy processing server 100. Therefore, a copy process of target data with a reduced impact on resources of the production environment system can be performed. Moreover, the first to third copy method determination processes are respectively independent of one another. When a determination to proceed to another copy processing method is made in the respective copy processing methods (steps S250, S370, and S490), another copy method determination processing method may be performed. For example, copy method determination processing methods may be performed in an order of first, second, and third or performed in any other order.

Example 4

Hereinafter, Example 4 will be described. The following description will focus on differences from Examples 1 to 3 and portions that overlap with Examples 1 to 3 will be omitted or simplified. Example 4 represents a snapshot application process that is suppletorily performed during the copy method determination processes according to Examples 1 to 3.

Figure 18:
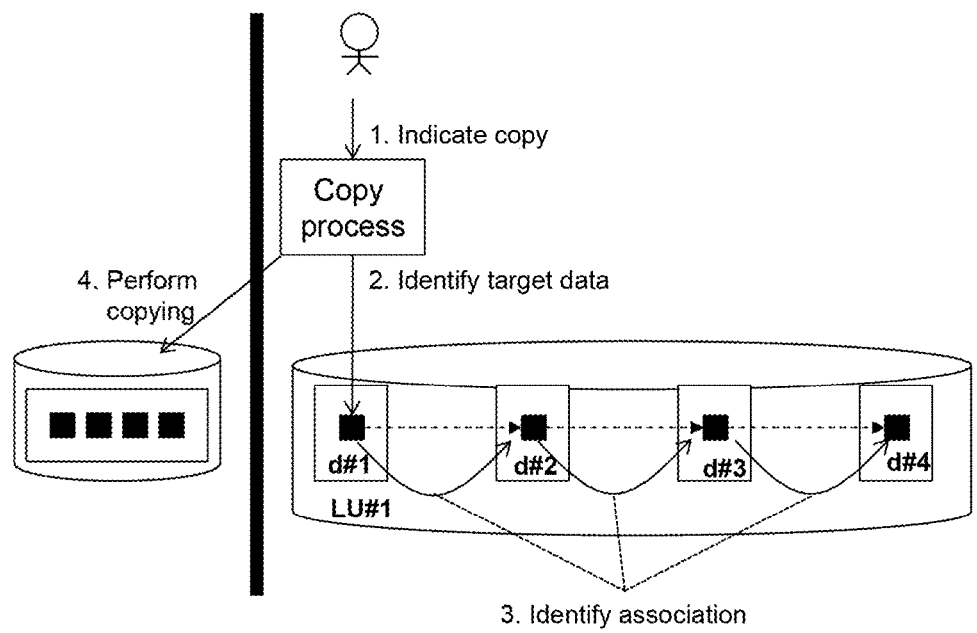
FIG. 18 is a diagram illustrating a snapshot application process.

FIG. 18 is a diagram illustrating the snapshot application process according to Example 4. The snapshot application process according to Example 4 is performed when the copy processing server 100 sets a plurality of pieces of data in a target LU as copy processing targets. In addition to data specified by the user using a copy indication, the copy processing server 100 may sometimes perform a copy process of data used by an application 304 associated with an application 304 that uses the specified data. Therefore, depending on the copy indication, data other than that specified by the user may become a target of a copy process. The copy processing server 100 basically retains an order of association of data and performs copy processes of data according to this order. Moreover, examples of cases where a plurality of pieces of data are associated with one another include a case where the plurality of pieces of data are created by applications provided by a same vendor.

FIG. 18 shows that there is association among data (d#1 to d#4) in four files in LU #1. In a copy indication by the user, for example, data (d#1) in the file at the left end is specified as target data of a copy process. In this case, it is assumed that the target data (d#1) references another piece of data (d#2), the data (d#2) references another piece of data (d#3), and the data (d#3) references another piece of data (d#4). Since the pieces of data (d#2, d#3, and d#4) are associated with the target data (d#1), these pieces of data are referred to as associated data. In this case, in an order of association, the order of data (d#2) is 1, the order of data (d#3) is 2, and the order of data (d#4) is 3. In addition, the copy indication by the user may include a notice that associated data having an association with the target data is to be included in the copy process and a reference stage number that is a value indicating to what order, from the target data, the associated data is to be included in the copy process. In this case, the copy processing server 10 performs the copy process by recognizing associated data in addition to the target data (d#1). Moreover, when receiving a copy indication to the effect that a copy process including associated data with a reference stage number of 1 is to be performed, the copy processing server 100 performs a copy process of the target data (d#1) and one piece of associated data (d#2) that is associated with the target data (d#1). In addition, when receiving a copy indication to the effect that a copy process including associated data with a reference stage number of 3 is to be performed, the copy processing server 100 performs a copy process of the target data (d#1), the associated data (d#2) that is associated with the target data (d#1), the associated data (d#3) that is associated with the associated data (d#2), and the associated data (d#4) that is associated with the associated data (d#3).

Figure 19:
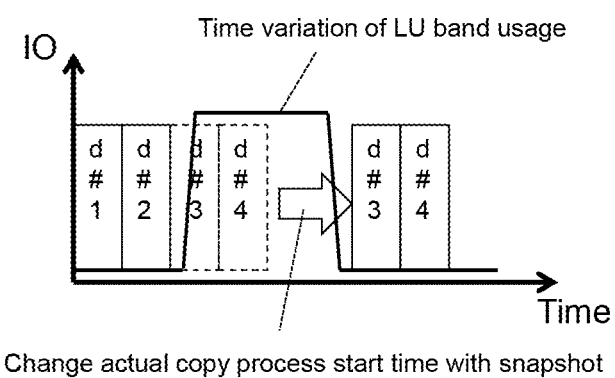
FIG. 19 is a diagram illustrating a timing of a copy process of target data.

FIG. 19 is a diagram illustrating a timing of a copy process of target data.

As described above, with the first to third copy processing methods, a copy process of a plurality of pieces of data including target data can be realized. However, in the present example, with respect to a copy process of target data, a more efficient copy process can be realized by recognizing a smaller area than an LU as a unit of a copy process. Specifically, for example, with the first to third copy processing methods, when copy processes of a plurality of pieces of data including target data cannot be performed at once, the management server 200 indicates the storage apparatus 500 to create a snapshot of an area of part of the data in a development environment system that is a copy destination. In doing so, a snapshot of an area of data that can be determined to have low importance, a low likelihood of being referenced, or a low use frequency even when referenced to may be created.

Subsequently, when LU band usage of a target LU is low in the production environment system, the management server 200 transmits a copy indication to the effect that a copy process of data in the area where the snapshot has been created is to be performed to the copy processing server 100. In this manner, by creating a snapshot of a target area that becomes a target of snapshot creation among a plurality of pieces of data in the development environment system that is a copy destination, a start time of a copy process of part of the data among the plurality of pieces of data including the target data can be changed. Moreover, in this case, application IO load information 1000 may also include information on IO band usage for each LBA acquired from application IO history information 1050.

In the drawing, a snapshot of storage areas of d#3 and d#4 in LU #1 is provided to the development environment system, whereby copy processes of d#3 and d#4 are performed when LU band usage of LU #1 is low and a maximum value (MAX) of LU band usage that is usable in LU #1 is not exceeded even when the copy processes of d#3 and d#4 are executed. Specifically, for example, the copy processing server 100 transmits a copy instruction based on specifications from the user to the management server 200. In this case, the copy instruction may include an identifier (d#1) of the target data, a storage area (LU #1, LBA) of the target data, an indication to the effect that associated data is to be copied, and the number of pieces of data (4) that include the target data or a reference stage number (3) from the target data. Subsequently, based on the copy instruction, the management server 200 determines a start time, a copying speed, and a copy processing method of a copy process for each of the plurality of pieces of data including the target data using the first to third copy method determination processes, and transmits a copy indication including the determined information to the copy processing server. In doing so, the management server 200 may transmit a copy indication for each of the plurality of pieces of data (d#1 to d#4) including the target data or may transmit a copy indication that compiles data to be subjected to subsequent copy processes. For example, the management server 200 may respectively transmit a copy indication for copying the target data (d#1) and associated data (d#2) with an association order of 1 and a copy indication which sets data (d#3) as target data and which is for copying the target data and associated data (d#4) with an association order of 1 from the target data to the copy processing server 100.

Moreover, when the host 301 accesses the snapshot of d#3 and #4 in the development environment system, in reality, an access occurs to d#3 and #4 which are pieces of data in the production environment system. In addition, by taking into consideration a frequency and a start time of access to the area where the snapshot is created, a server of the development environment system can efficiently utilize data scheduled to be subjected to copy processes. Furthermore, by performing a copy process that takes IO band usage and the like into consideration with respect to a target LU, a copy process having a reduced impact on resources of the production environment system can be performed as compared to a case where all of a plurality of pieces of data including target data are successively copied.

Figure 20:
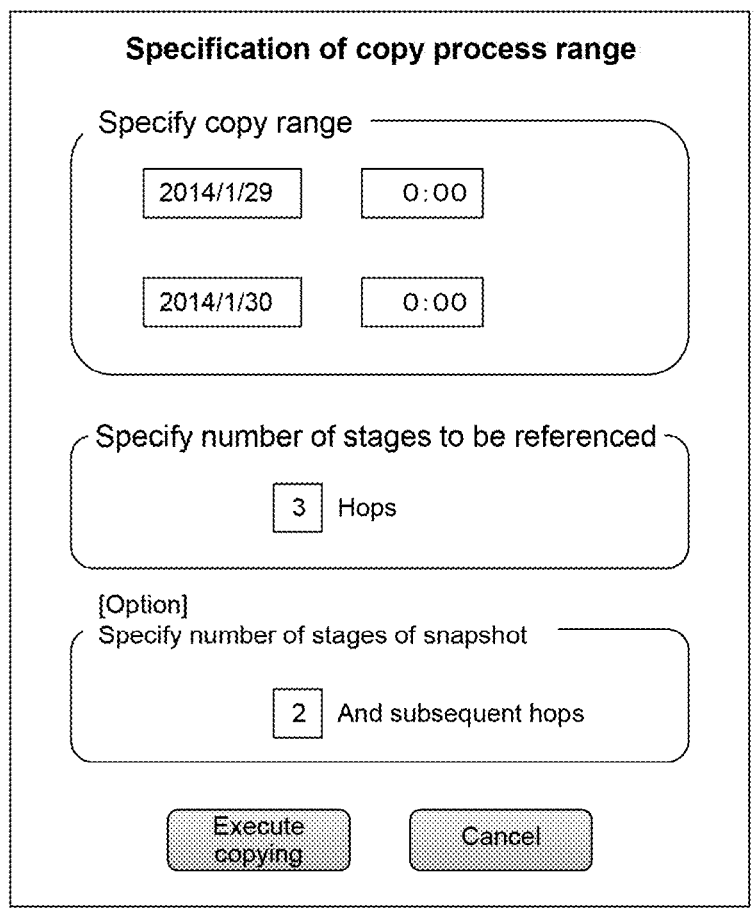
FIG. 20 shows an example of a specification screen of a copy processing range.

FIG. 20 shows an example of a specification screen of a copy processing range.

An area in which a snapshot is to be created may be specified in advance by the user at, for example, the start of a copy process. FIG. 20 shows a screen image in this case.

The user specifies a copy range representing a time at which a copy process is to be performed, a reference stage number from target data, and a start stage number representing an order of starting creation of snapshots among an association order equal to or less than the reference stage number. Moreover, in the following description and in the drawings, a unit of the number of times a piece of data references another piece of data in an association order may sometimes be called a "hop". For example, when data A is associated with data B and data B is associated with data C, data B is data that is 1 hop away from data A and data C is data that is 2 hops away from data A. By having the user specify the start stage number for creating a snapshot, a range that does not impact resources of the production environment system can be specified and data of a target area can be copied to the development environment system in an efficient manner.

Figure 21:
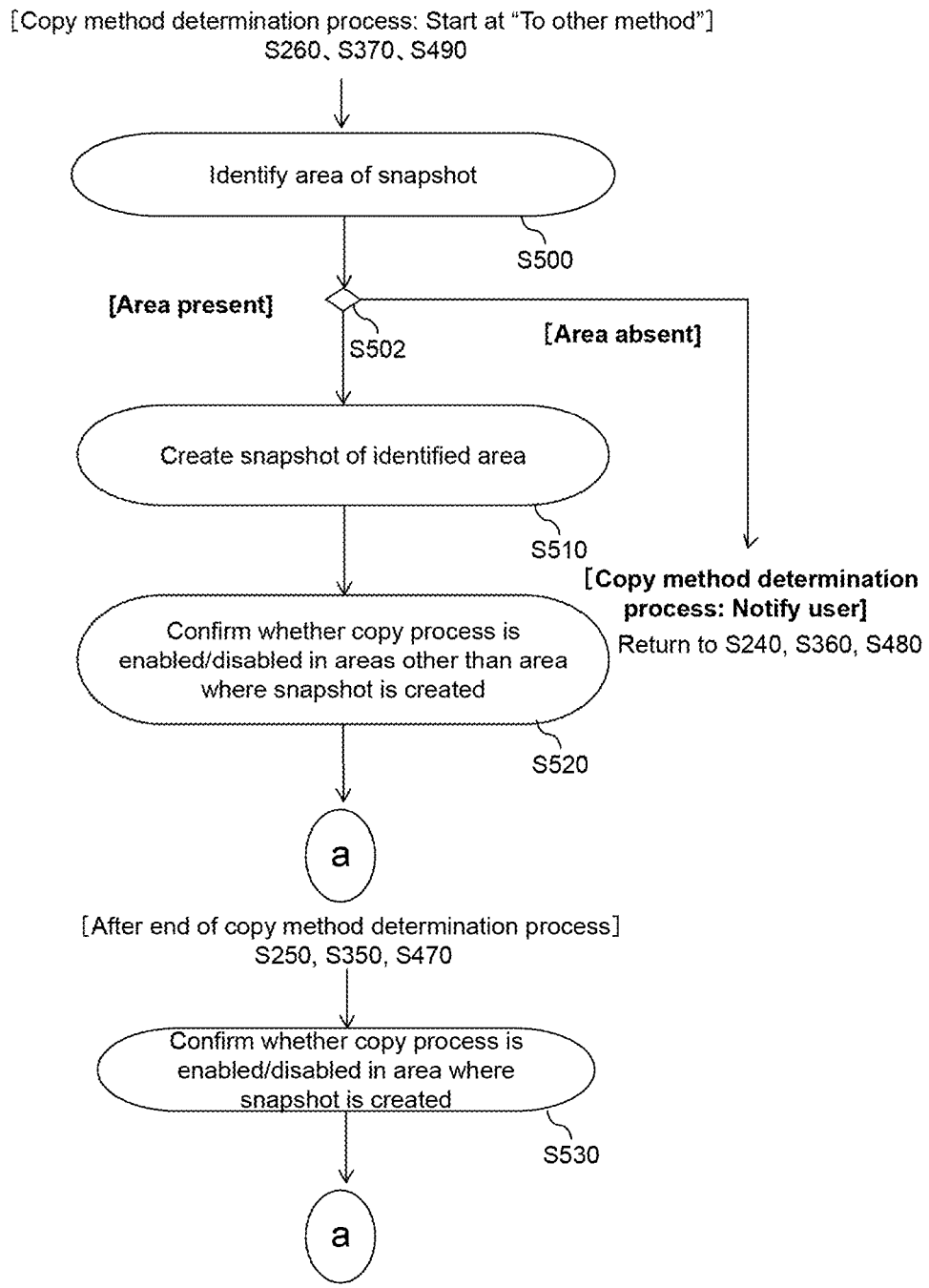
FIG. 21 is a flow chart of a snapshot application process.

FIG. 21 is a flow chart of a snapshot application process.

The snapshot application process may be performed after performing any of or all of the first to third copy method determination processes or may be incorporated into these copy method determination processes. Specifically, this process may be incorporated when the management server 200 proceeds to another copy processing method during any of the first to third copy method determination processes (S260 in FIG. 10, S370 in FIG. 13, or S490 in FIG. 16). Alternatively, the snapshot application process may be performed before the first to third copy method determination processes.

First, the management server 200 identifies an area where a snapshot can be created for a plurality of pieces of data including target data (step S500).

When there is no area where a snapshot can be created (S502: area absent), the management server 200 returns the process to any of the first to third copy method determination processes, notifies the user that a snapshot cannot be created (S240, S360, or S480), and ends the process.

When there is an area where a snapshot can be created (S502: area present), the management server 200 creates a snapshot of the identified area (step S510). The management server 200 determines whether or not a copy process of data in areas other than the area where the snapshot has been created in the target LU (step S520). Specifically, for example, the management server 200 may make a determination according to any of the first to third copy method determination processes described earlier.

Moreover, when a copy process of data in areas other than the area where the snapshot has been created can be performed, the management server 200 returns the process to the first to third copy method determination processes (a). Specifically, for example, the management server 200 hands over a location and a capacity of areas where a snapshot has not been created to the first to third copy method determination processes. Moreover, when it cannot be confirmed that a copy process can be performed with respect to data in areas other than the area where the snapshot has been created, the management server 200 may notify the user as such.

In addition, after a copy process with respect to data in areas other than the area where the snapshot has been created is completed in the first to third copy method determination processes, the management server 200 confirms whether or not a copy process of data in the area where the snapshot has been created can be performed (step S530). The management server 200 returns the process to the first to third copy method determination processes with respect to data in the area where the snapshot has been created (a). Specifically, for example, the management server 200 hands over a location and a capacity of the area where a snapshot has been created to the first to third copy method determination processes.

According to the process described above, with respect to data for which a copy process could not be performed in an initial copy processable period, a copy process can be performed in a subsequent copy processable period. In addition, even when all copy processes of a plurality of pieces of data including target data cannot be performed within a copy processable period, by creating a snapshot of an area of data that enables a snapshot to be created in the development environment system, the development environment system can utilize all data before the copy processes of the plurality of pieces of data including the target data are completed. Accordingly, since a copy process that takes IO band usage and the like into consideration with respect to a target LU can be performed, a copy process having a reduced impact on resources of the production environment system can be performed as compared to a case where all of a plurality of pieces of data including target data are successively copied.

Moreover, a same copy method determination process need not be performed for an area where a snapshot has not been created and an area where a snapshot has been created, and respectively different copy method determination processes may be executed. However, performing a copy process of an area where a snapshot has been created is mandatory. For example, by using the snapshot application process according to the present example, when it is determined by the first to third copy method determination processes that copy processes of a plurality of pieces of data including target data can be realized, the management server 200 may separately confirm a start time and an end time of a copy process of data in an area where a snapshot has been created and determine whether or not to execute the snapshot application process according to the present example together with the information on the start time and the end time. For example, at a timing of presenting information to the user in steps S220, S330, and S450, an implementation schedule of a copy process of an area where a snapshot has been created may be presented to the user together with a result of copy processes of an area where a snapshot has not been created to have the user make a determination.

Example 5

Hereinafter, Example 5 will be described. The following description will focus on differences from Examples 1 to 4 and portions that overlap with Examples 1 to 4 will be omitted or simplified. Example 5 represents an order changing process for the first to third copy processing methods and the snapshot application process described above.

Figure 22:
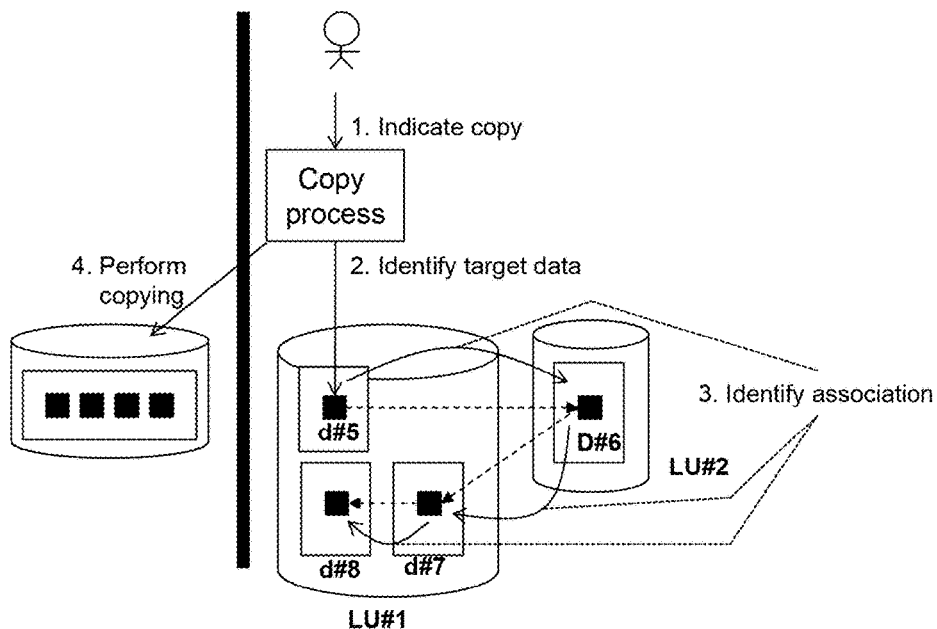
FIG. 22 is a diagram illustrating an order changing process.

FIG. 22 is a diagram illustrating the order changing process according to Example 5.

The order changing process is performed when associated data that is associated with target data specified in a copy indication by the user is present not only in an area of a target LU but also in an area of another LU. Specifically, in the example shown in FIG. 22, there is association between data (d#5, d#7, and d#8) in three files in LU #1 and data (d#6) in one file in LU #2. In addition, the copy indication by the user specifies, for example, data (d#5) in a top left file as target data of a copy process. In this case, the copy processing server 10 performs copy processes by recognizing associated data in addition to the target data (d#5). For example, when receiving a copy indication that indicates performing a copy process including associated data with a reference stage number of 3, the copy processing server 100 performs copy processes of the target data (d#5), the associated data (d#6) that is associated with the target data (d#5), the associated data (d#7) that is associated with the associated data (d#6), and the associated data (d#8) that is associated with the associated data (d#7).

Figure 23:
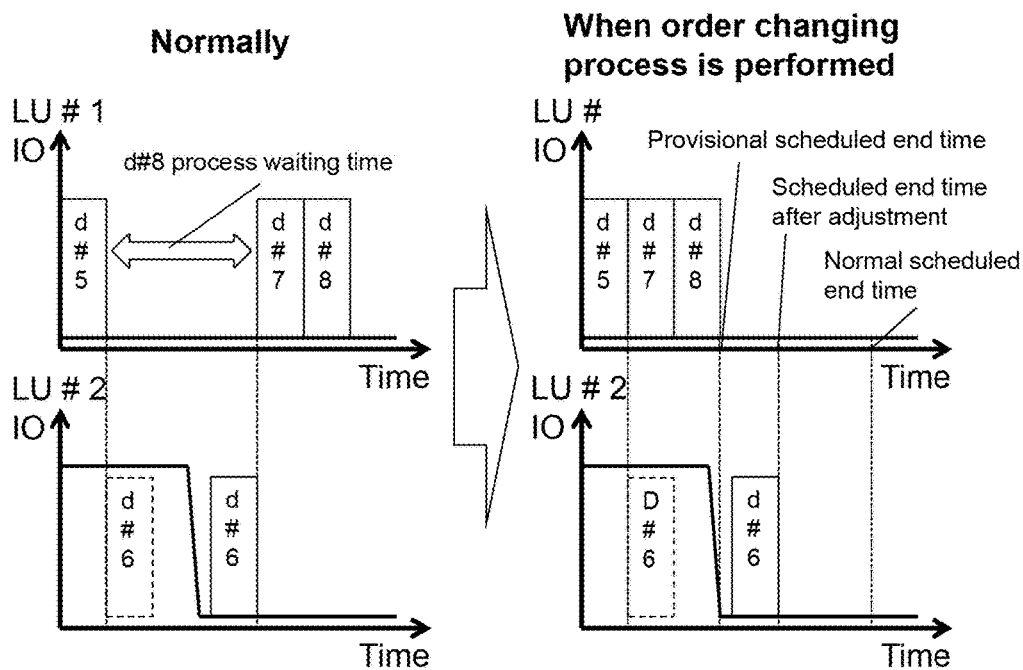
FIG. 23 is a diagram illustrating an order of a copy process of target data.

FIG. 23 is a diagram illustrating an order of a copy process of target data.

Generally, with a plurality of pieces of associated data including target data, importance of data conceivably declines as a value of a reference stage number from the target data specified in the copy indication by the user increases. Meanwhile, the copy processing server 100 cannot execute copy processes when an association order of a plurality of pieces of data including target data is changed. Therefore, the copy processing server 100 basically retains the association order of the target data and performs a copy process of the target data according to this order.

A left diagram in FIG. 23 shows an association order of a plurality of pieces of data including target data retained by the copy processing server 100 in a normal case or, in other words, when conforming to the association order of the plurality of pieces of data including the target data. In this case, in the example shown in FIG. 23, the copy process is performed in an order of d#5, d#6, d#7, and d#8. However, for example, when LU band usage that is usable in LU #2 is insufficient, waiting occurs in the copy process of data (d#6) by just that much. Consequently, performing the copy process according to the association order of data results in delaying an end time of the entire copy process.

A right diagram in FIG. 23 shows an order of a copy process of a plurality of pieces of data including target data when using the order changing process according to the present example in the situation described above.

As a prerequisite, the copy processing server 100 transmits a copy instruction based on specifications by the user to the management server 200. In this case, the copy instruction may include an identifier (d#5) of the target data, a storage area (LU #1, LBA) of the target data, an indication to the effect that copy processes of associated data are to be performed, and the number of pieces of data (4) that include the target data or a reference stage number (3) from the target data.

Based on the copy instruction, the management server 200 estimates an end time of copy processes of a plurality of pieces of data including the target data (d#5 to d#8) in a normal case as a normal scheduled end time (refer to the right diagram in FIG. 23). In the illustrated example, since LU band usage that is usable in LU #2 is insufficient and waiting has occurred in the copy process of the target data (d#6), it is conceivable that data (d#6) is acting as a bottleneck of the entire copy process. Therefore, the management server 200 estimates an end time of copy processes of pieces of data (d#7 and d#8) when executing the copy processes of the pieces of data (d#7 and d#8) during a wait time of data (d#6) as a tentative end time (refer to the right diagram in FIG. 23). Furthermore, the management server 200 estimates an end time of the entire copy process when executing the copy process of data (d#6) after executing the copy processes of the pieces of data (d#7 and d#8) as a scheduled end time after adjustment (refer to the right diagram in FIG. 23). As shown, when the scheduled end time after adjustment occurs earlier than the normal scheduled end time, a snapshot of data (d#6) acting as a bottleneck or a snapshot of data including data (d#6) is created in the development environment system. In addition, with respect to data for which a snapshot has been created, a copy process may be performed when there is a margin in the band of LU 1#2 in which the data is to be stored.

Figure 24:
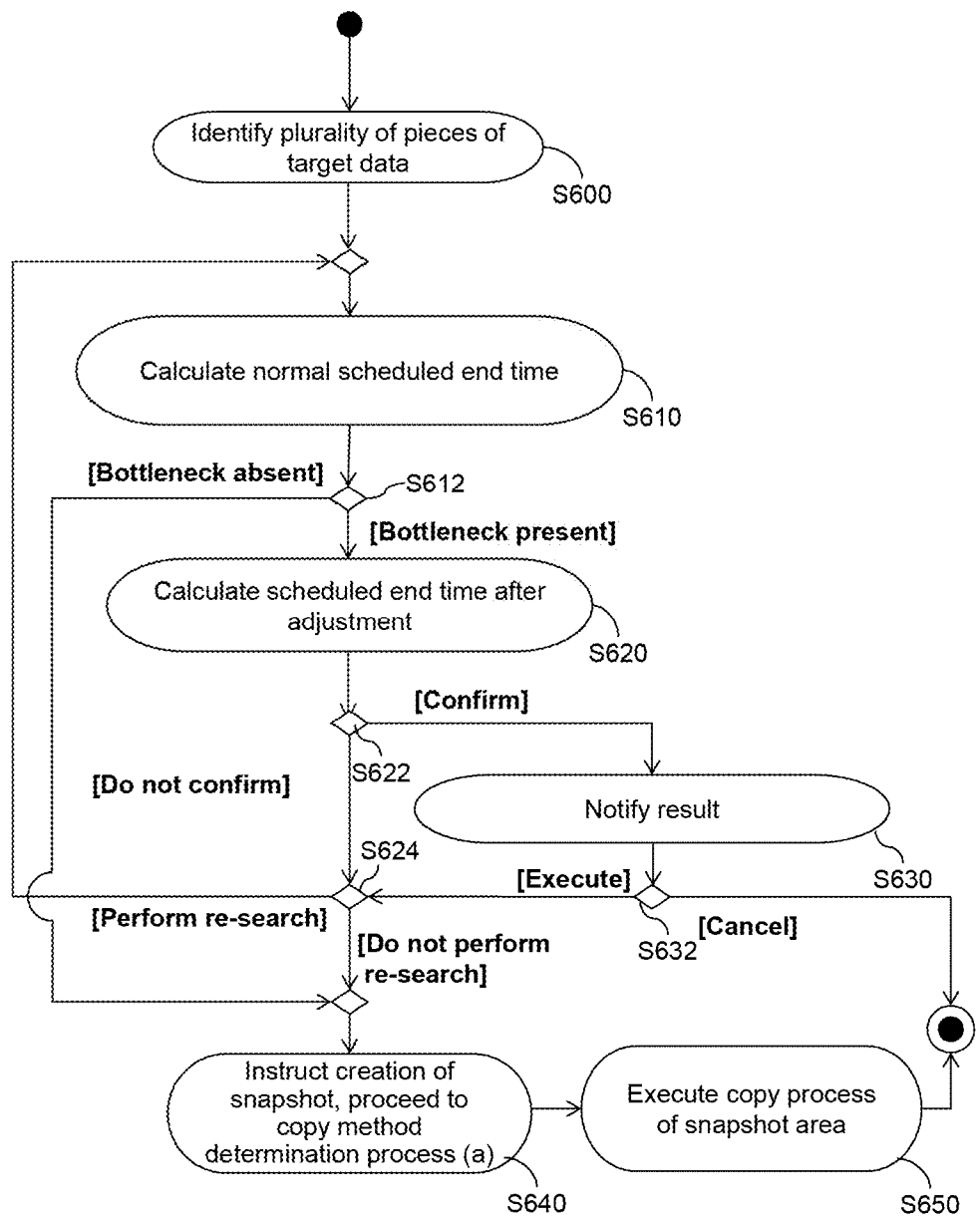
FIG. 24 is a flow chart of the order changing process.

FIG. 24 is a flow chart of an order changing process.

The order changing process according to Example 5 may be performed after performing any of the first to third copy method determination process or may be incorporated into these copy method determination processes. Specifically, the process may be incorporated when the management server 200 proceeds to another copy method determination process in the first to third copy method determination processes (S260 in FIG. 10, S370 in FIG. 13, or S490 in FIG. 16). Alternatively, the snapshot application process may be performed before the first to third copy method determination processes.

First, the management server 200 receives a copy instruction from the copy processing server 100 and identifies target data and associated data included in the copy instruction (step S600).

The management server 200 calculates an end time (a normal scheduled end time) when copy processes are performed in an order conforming to an association order of a plurality of pieces of data including the target data (step S610). In doing so, the management server 200 checks an earliest ending time when copy processes of a plurality of identified pieces of data are performed. Specifically, for example, the management server 200 checks, for each piece of data, a copy processing method capable of ending a copy process at an earliest time using any of the first to third copy method determination processes or by combining these copy method determination processes.

The management server 200 checks whether there is data for which waiting occurs if a normal copy process conforming to an association order is performed with respect to a plurality of pieces of data including the target data. As a checking result, when there is data for which waiting occurs due to insufficient LU band usage and start of a copy process of the data is to be delayed, the management server 200 determines the data to be a bottleneck. The management server 200 determines whether or not a bottleneck is present (step S612). When a bottleneck is absent (S612: bottleneck absent), the management server 200 advances the process to step S640. On the other hand, when a bottleneck is present (S612: bottleneck present), the management server 200 calculates an end time after adjustment that is an end time of a copy process when an association order of a plurality of pieces of data including the target data is changed (step S620). Moreover, at this point, the management server 200 calculates an end time of a copy process (a tentative scheduled end time) when a copy process is performed only on data stored in LUs 600 other than the LU 600 storing the data acting as a bottleneck. In addition, the management server 20 may calculate, as an end time after adjustment, an end time of copy processes of all of the plurality of pieces of data when changing the order so that a copy process of the data acting as a bottleneck is performed after the tentative scheduled end time.

The management server 200 determines whether or not the result of the end time after adjustment calculated in S620 is to be confirmed with the user (step S622). When the result is not to be confirmed (S622: do not confirm), the management server 200 returns the process to S610 if a re-search is necessary (step S622: perform re-search) or advances the process to step S640 if a re-search is unnecessary (step S622: do not perform re-search). Moreover, when the result is not to be confirmed with the user, whether or not to apply a snapshot may be automatically determined based on criteria such as a copying period being shortened from an initial schedule. In this case, since an order of a copy process is automatically changed by the application of a snapshot, the management server 200 may further confirm the presence or absence of a bottleneck after the order change. This determination may be made in response to an indication by the user or may be automatically triggered by a reduction rate in processing time as compared to an initial processing time.

Figure 25:
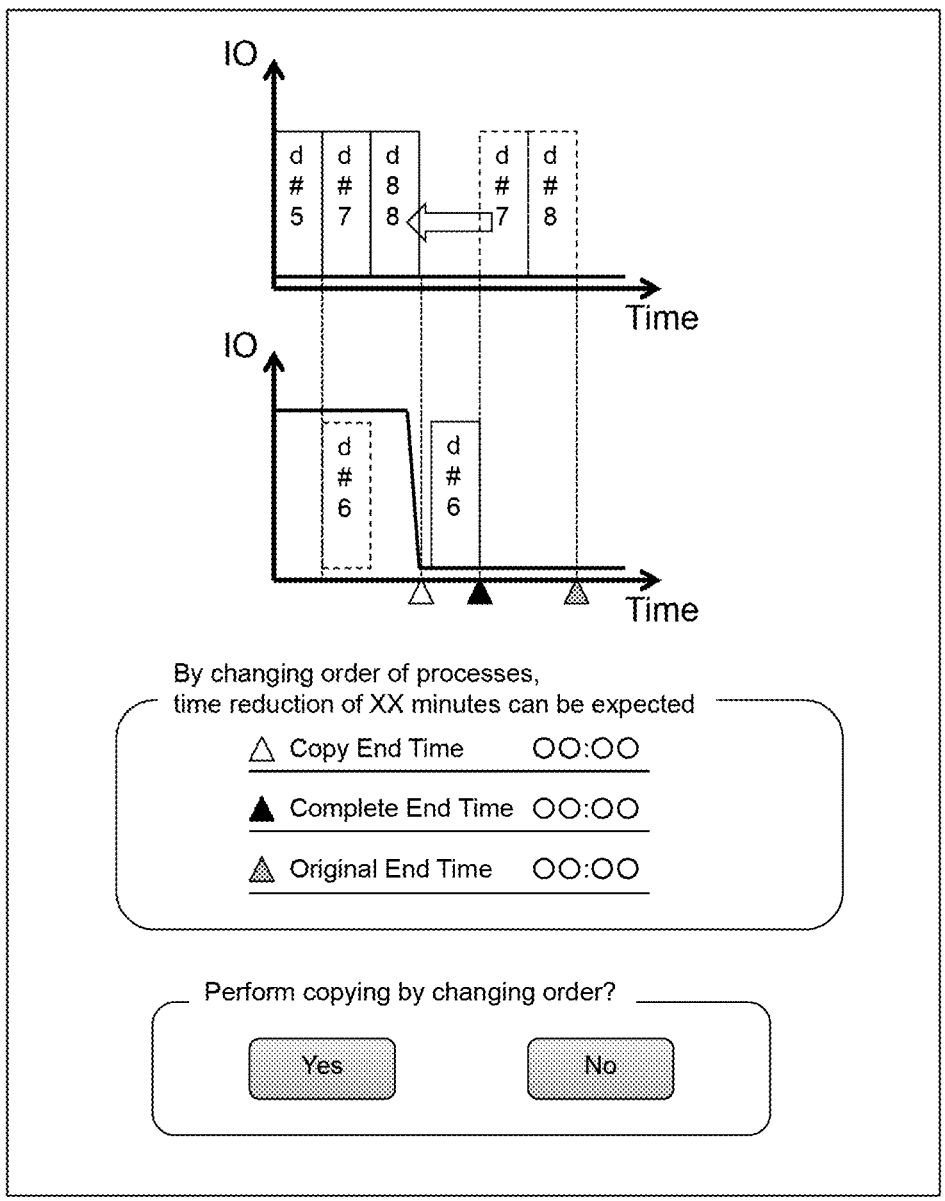
FIG. 25 shows an example of a notification screen of a result of the order changing process.

On the other hand, when the result of the end time after adjustment is to be confirmed by the user (S622: confirm), the management server 200 notifies the result to the user (step S630). An example of a result notification screen to the user is shown in FIG. 25. The notification screen displays a normal scheduled end time (Original End Time), a tentative scheduled end time (Copy End Time), and a scheduled end time after adjustment (Complete End Time). According to the screen, the user determines whether or not to execute a copy process with a changed copying order.

The management server 200 determines whether or not to perform an order changing process (S632). When the order changing process is not to be executed (S632: cancel), the management server 200 ends the process. On the other hand, when the order changing process is to be executed (S632: execute), the management server 200 returns the process to S610 if a re-search is to be performed (step S624: perform re-search) or advances the process to step S640 if a re-search is not to be performed (step S624: do not perform re-search).

The management server 200 transmits an instruction to create a snapshot of a storage area of the data acting as a bottleneck to the storage apparatus 500 storing the data (S640). Subsequently, the management server 200 returns the process to the first to third copy method determination processes for data other than the data for which a snapshot has been created (a). Specifically, for example, the management server 200 hands over a location of an area storing data other than the data for which a snapshot has been created, a size of the data, a copying order of the data, and the like to the first to third copy method determination processes.

Due to the end of the first to third copy method determination processes, copy processes of data other than the data acting as a bottleneck have been completed. Therefore, the management server 200 indicates the copy processing server 100 to execute a copy process of the data acting as a bottleneck (step S650). In this manner, by executing the order changing process and creating a snapshot of data acting as a bottleneck, the development environment system can be provided with a plurality of pieces of data including target data in an order maintaining association. Therefore, the development environment system can utilize a plurality of pieces of data including target data without being aware of an amount of time necessary for copy processes. Moreover, since a large number of snapshots may be used in the present example, whether or not to apply snapshots must be determined while taking a state of occurrence of accesses from a copy destination into consideration. For example, the present method can be readily applied in a state where a time point at which data copied in a copy destination environment is to be used has been finalized. While an example of creating a snapshot of only a storage area of target data acting as a bottleneck has been presented above, this example is not restrictive. For example, the management server 200 may instruct the storage apparatus 500 to create snapshots of all storage areas of a plurality of pieces of data including the target data. Alternatively, an area where a snapshot is created may be specified by the user in advance at, for example, the start of a copy process.

According to the methods described above, copy processes of a plurality of pieces of data including target data can be realized while reducing the impact on resources of a production environment system. Moreover, while the examples described above address copy processes of data stored in the storage apparatus 500, target data may alternatively be stored in a virtual machine (a virtual storage apparatus). Applying the present example enables a copy process of target data to be realized while reducing the impact on resources of an environment that is being utilized by the virtual machine. In this case, the management server 200 recognizes information of all hosts 301 of the production environment system, and by recognizing states of use of a CPU and a memory of each host 301 as well as load information on a network between the hosts 301, the management server 200 executes copy processes with a reduced impact on resources of the production environment system. Furthermore, migration of a virtual machine (storage migration) including migration of a virtual image as well as cloning of a virtual machine can also be realized without impacting the production environment. In cases of storage migration and cloning, processes are to be executed by taking states of storages into consideration as described above in addition to considering CPUs, memories, and load information on a network between hosts.

Moreover, the first system corresponds to a production environment system and the like while the second system corresponds to a development environment system and the like.

REFERENCE SIGNS LIST

100 Copy processing server
200 Management server
201 CPU
202 Memory
210 Application configuration information acquisition processing unit
211 Application IO information acquisition processing unit
212 Storage configuration information acquisition processing unit
213 Storage IO information acquisition processing unit
214 Host configuration information acquisition processing unit
215 Integrated configuration information acquisition processing unit
216 Estimation processing unit
217 Control processing unit
300a Application server (App #1)
300b Application server (App #2)
300c Application server (App #3)
500 Storage apparatus
600 LU
1000 Application IO load information
1050 Application IO history information
1100 Application configuration information
1200 Host-storage information
1300 Application-VM-host association information
1400 Storage configuration information
1500 Storage IO load information
1700 Integrated configuration information

The invention claimed is:

1. A management server coupled to:
a first system including a processor configured to execute an application, and a storage apparatus coupled to the processor; and
a copy processing server configured to, in accordance with a copy indication that indicates copying of data stored in a storage area in the storage apparatus to a second system, execute a copy process of the data, wherein
the management server comprises a storage device and a control device, the control device is configured to acquire storage information and application information from the first system and store the information in the storage device, the storage information includes storage area correspondence information indicating a correspondence relationship between the storage area and the processor, the application information includes application correspondence information indicating a correspondence relationship between the processor and the application, and application configuration information indicating a past IO load on the storage area by the application, and
the control device is further configured to:
estimate an IO (Input or Output) load on the storage area by the application based on the storage information and the application information to obtain an estimated value;
determine whether or not a copy processable period that is a period in which a copy process of the data can be performed is present, based on a data size of the data and copying speed candidates according to the estimated value; and
when the copy processable period is present, transmit a copy indication including a start time of the copy processable period to the copy processing server.

2. The management server according to claim 1, wherein the storage device is configured to:
further store log information that records a time variation of band usage of the storage area as the storage information; and
further store log information that records a time variation of band usage of the storage apparatus by the application as the application information, and
the control device is configured to:
estimate a time variation of band usage of an IO of the storage area by the application based on the storage information and the application information to obtain the estimated value;
determine a copying speed of the data based on the data size of the data and the estimated value; and
include the determined copying speed of the data in the copy indication.

3. The management server according to claim 1, wherein the control device is configured to:
determine a copying speed so that the copy process is completed within the copy processable period; and
include the determined copying speed in the copy indication.

4. The management server according to claim 2, wherein the storage device is configured to store a plurality of copying speed candidates determined in advance for the copy process, and
the control device is configured to:
calculate a copy processing period and band usage according to each of the plurality of copying speed candidates when performing the copy process, based on the data size of the data; and
determine a copying speed of the data from the plurality of copying speed candidates based on the estimated value and the copy processing periods and the band usage according to the plurality of copying speed candidates.

5. The management server according to claim 2, wherein the storage device is configured to store a plurality of copying speed candidates determined in advance for the copy process, and
the control device is configured to:
calculate a copy processing period and band usage according to each of the plurality of copying speed candidates when performing the copy process, based on the data size of the data;
change a scheduled period that is a scheduled execution period of the application, based on the estimated value; and
determine a copying speed of the data from the plurality of copying speed candidates based on the estimated value and the copy processing periods and the band usage with respect to the plurality of copying speed candidates in the changed scheduled period.

6. The management server according to claim 2, wherein the control device is configured to execute one copy method determination process that is determined in advance among:
a first copy method determination process in which the control device determines a copying speed so that the copy process is completed within the copy processable period;
a second copy method determination process in which the storage device stores a plurality of copying speed candidates determined in advance for the copy process, and the control device calculates a copy processing period and band usage according to each of the plurality of copying speed candidates when performing the copy process, based on the data size of the data, and determines a copying speed of the data from the plurality of copying speed candidates based on the estimated value and the copy processing periods and the band usage according to the plurality of copying speed candidates; and
a third copy method determination process in which the storage device stores a plurality of copying speed candidates determined in advance for the copy process, and the control device calculates a copy processing period and band usage according to each of the plurality of copying speed candidates when performing the copy process, based on the data size of the data, changes a scheduled period that is a scheduled execution period of the application, based on the estimated value, and determines a copying speed of the data from the plurality of copying speed candidates based on the estimated value and the copy processing periods and the band usage with respect to the plurality of copying speed candidates in the changed scheduled period.

7. The management server according to claim 6, wherein when it is determined by any copy method determination process among the first to third copy method determination processes that the copy processable period is absent, the control device is configured to migrate from the copy method determination process being executed to another copy method determination process.

8. The management server according to claim 7, wherein the control device is configured to execute any one of the first to third copy method determination processes when receiving a copy indication including identification information, a size, and a storage area of the data from the copy processing server.

9. The management server according to claim 1, wherein the data includes first and second pieces of data that are associated with each other,
the storage device is configured to store information indicating an association between the first and second pieces of data, and
the control device is configured to:
determine whether or not a copy processable period that enables the first and second pieces of data to be consecutively copied is present based on a total size of the first and second pieces of data and the estimated execution period;
when the copy processable period is absent and a snapshot of a storage area of the second piece of data that is associated with the first piece of data can be created in the second system, indicate the storage device to create a snapshot of the storage area of the second piece of data; and after transmitting a copy indication for the first piece of data to the copy processing server, transmit a copy indication with respect to the second piece of data to the copy processing server.

10. The management server according to claim 1, wherein the data includes a first piece of data, a second piece of data that is associated with the first piece of data, and a third piece of data that is associated with the second piece of data, the storage device is configured to store information indicating an order of association among the first, second, and third pieces of data, and the control device is configured to:
calculate a normal end time at which copy processes of all of the first, second, and third pieces of data end when the copy processes of all of the data are to be performed according to the order of association when the copy processable period is present for each of the first, second, and third pieces of data, and calculate a changed-order end time that applies when copy processes of all of the first, second, and third pieces of data are performed in an order that differs from the order of association;

indicate the storage apparatus to create a snapshot of a storage area of the second piece of data when the changed-order end time occurs earlier than the normal end time in a copy process of the second piece of data due to the occurrence of waiting; and after transmitting a copy indication with respect to the first and third pieces of data to the copy processing server, transmit a copy indication with respect to the second piece of data to the copy processing server.

11. A computer system comprising:
a first system including a processor and a storage apparatus coupled to the processor;
a copy processing server configured to, in accordance with a copy indication that indicates copying of data stored in a storage area in the storage apparatus to a second system, execute a copy process of the data; and
a management server coupled to the first system and the copy processing server, wherein
the management server is configured to acquire storage information and application information from the first system and store the information;
the storage information includes storage area correspondence information indicating a correspondence relationship between the storage area and the processor;
the application information includes application correspondence information indicating a correspondence relationship between the processor and the application, and application configuration information indicating a past IO load on the storage area by the application; and
the management server is further configured to:
estimate an IO (Input or Output) load on the storage area by the application based on the storage information and the application information to obtain an estimated value;

determine whether or not a copy processable period that is a period in which a copy process of the data can be performed is present, based on a data size of the data and copying speed candidates according to the estimated value; and when the copy processable period is present, transmit a copy indication including a start time of the copy processable period to the copy processing server.

12. The computer system according to claim 11, wherein the management server is configured to:
further store log information that records a time variation of band usage of the storage area as the storage information and further store log information that records a time variation of band usage of the storage apparatus by the application as the application information;

estimate a time variation of band usage of an TO of the storage area by the application based on the storage information and the application information to obtain the estimated value;

determine a copying speed of the data based on the data size of the data and the estimated value; and include the determined copying speed of the data in the copy indication.

13. A method of management using a management server coupled to:
a first system including a processor and a storage apparatus coupled to the processor; and
a copy processing server configured to, in accordance with a copy indication that indicates copying of data stored in a storage area in the storage apparatus to a second system, execute a copy process of the data,
the method comprising the processes of:
using the management server to acquire storage information and application information from the first system and store the information, the storage information including storage area correspondence information indicating a correspondence relationship between the storage area and the processor, and the application information including application correspondence information indicating a correspondence relationship between the processor and the application, and application configuration information indicating a past IO load on the storage area by the application;

using the management server to estimate an IO (Input or Output) load on the storage area by the application based on the storage information and the application information to obtain an estimated value;

using the management server to determine whether or not a copy processable period that is a period in which a copy process of the data can be performed is present, based on a data size of the data and copying speed candidates according to the estimated value; and using the management server to transmit a copy indication including a start time of the copy processable period to the copy processing server when the copy processable period is present.

* * * * *